United States Patent [19]
Tamiya

[11] Patent Number: 4,794,554
[45] Date of Patent: Dec. 27, 1988

[54] ELECTRONIC CALCULATOR HAVING A GRAPH DISPLAY FUNCTION

[75] Inventor: Morito Tamiya, Tokyo, Japan

[73] Assignee: Casio Computer Co., Ltd., Tokyo, Japan

[21] Appl. No.: 868,302

[22] Filed: May 27, 1986

[30] Foreign Application Priority Data

May 31, 1985 [JP] Japan .................................. 60-118408

[51] Int. Cl.[4] .......................... G06F 3/14; G06F 15/66
[52] U.S. Cl. ................................ 364/710.01; 364/521
[58] Field of Search ......................... 364/710, 709, 521

[56] References Cited

U.S. PATENT DOCUMENTS 4,535,416 8/1985 Kano et al. ..................... 364/710 X
4,545,023 10/1985 Mizzi ................................... 364/709
4,566,072 1/1986 Mortensen et al. ............. 364/710 X
4,622,641 11/1986 Stephens ........................ 364/521 X Primary Examiner—David H. Malzahn
Attorney, Agent, or Firm—Frishauf, Holtz, Goodman & Woodward

[57] ABSTRACT

An electronic calculator having a graph display function which displays a graph of a desired function on a liquid-crystal display screen, within a designated range, input from a keyboard. The electronic calculator can change the range using a predetermined point or range on the screen as the center, thus enlarging or reducing the displayed graph to a desired magnification.

7 Claims, 35 Drawing Sheets

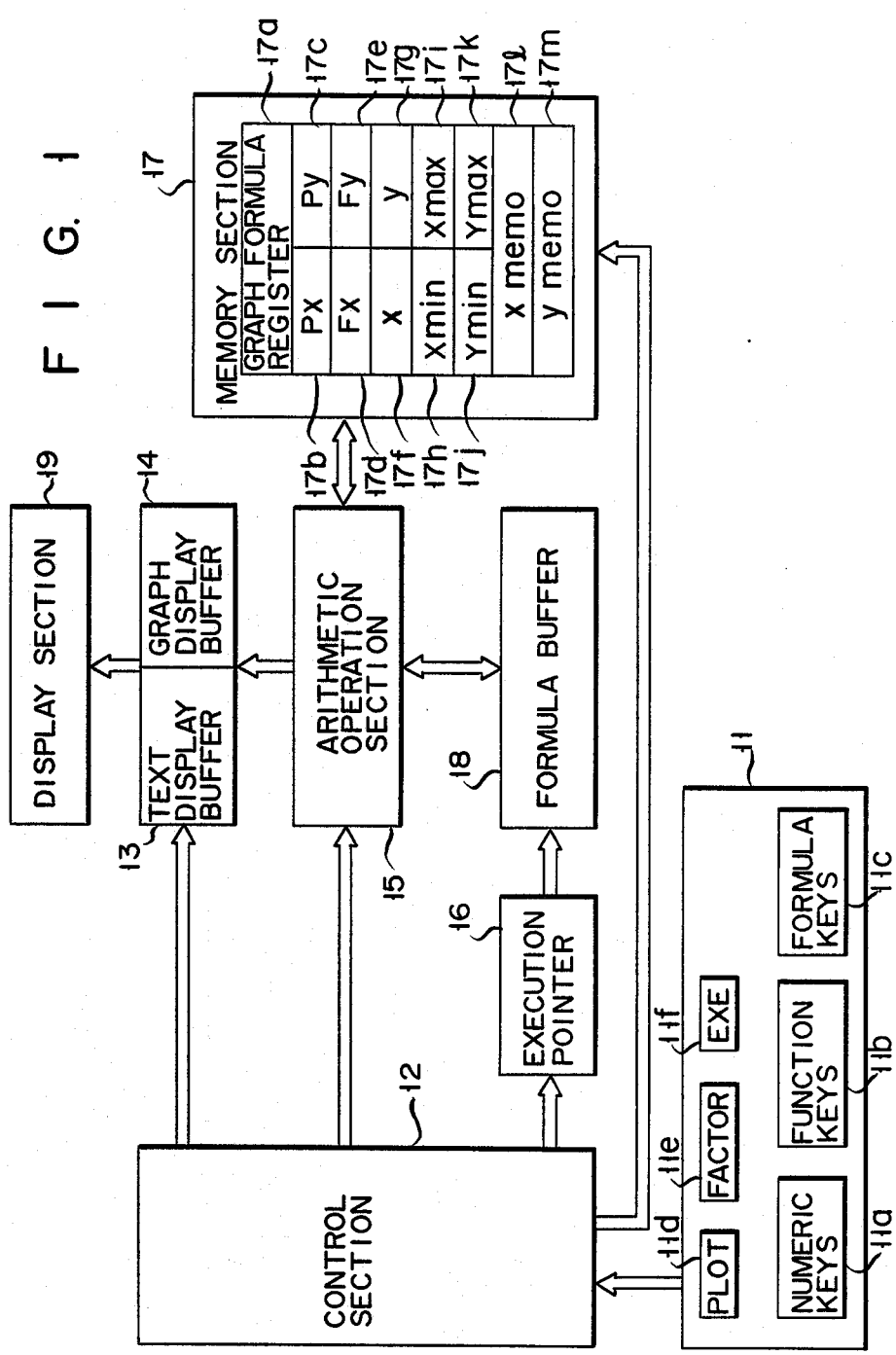
F I G. 1

F I G. 2A 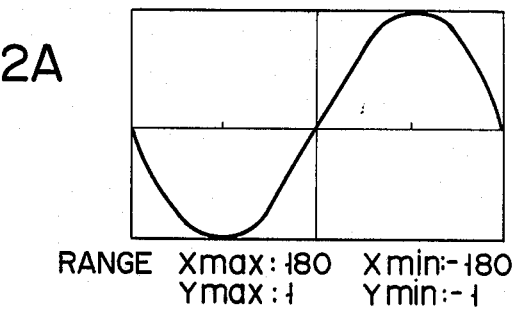
F I G. 2B
[PLOT] [EXE]
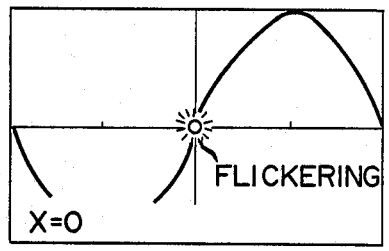
F I G. 2C
[FACTOR] [2]
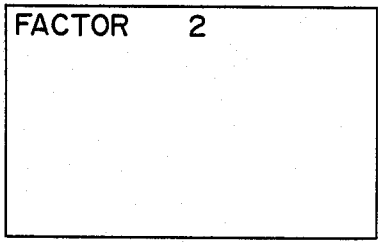
F I G. 2D
[EXE]
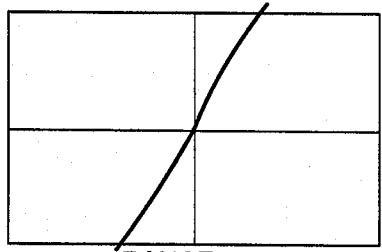

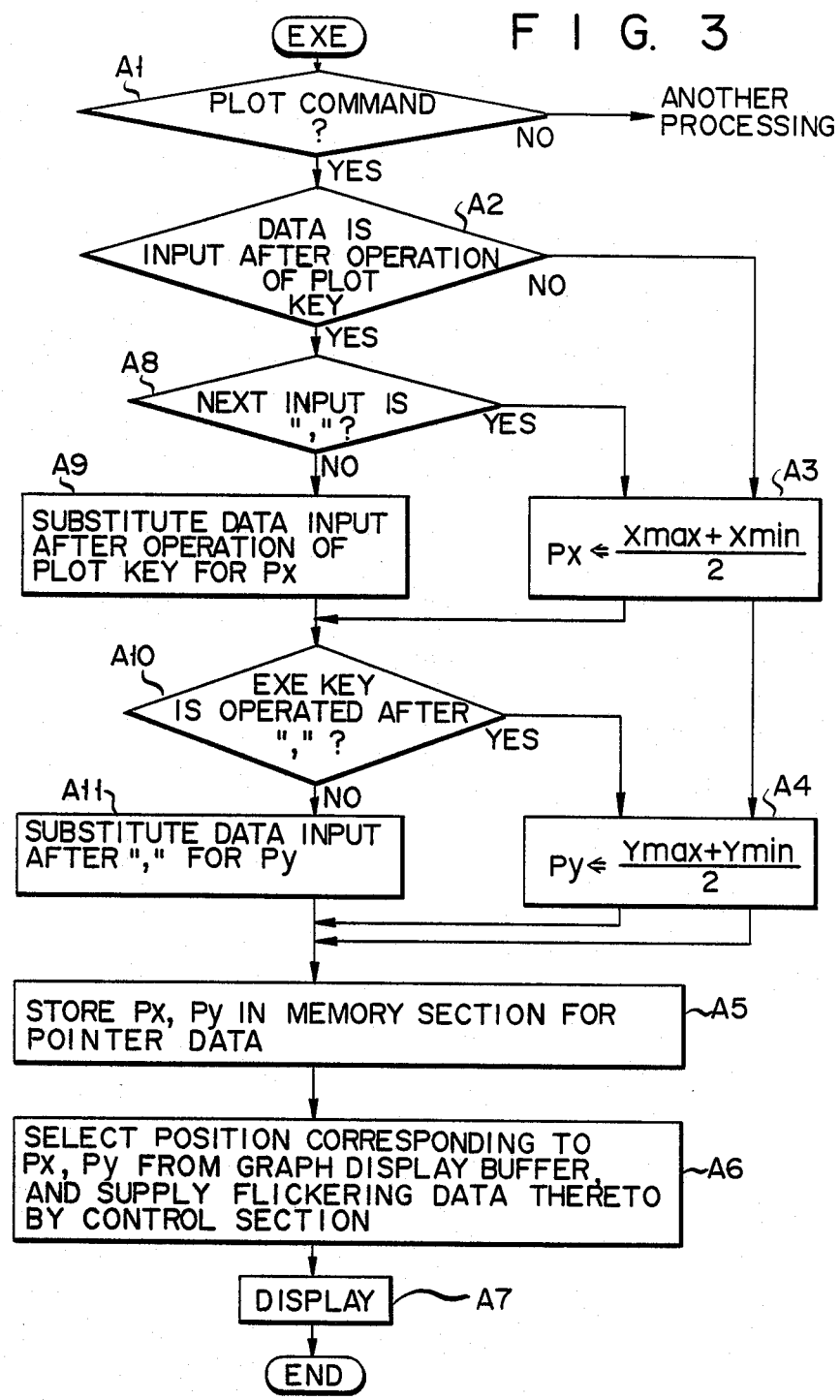

F I G. 5A
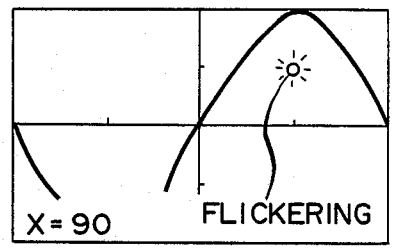
F I G. 5B
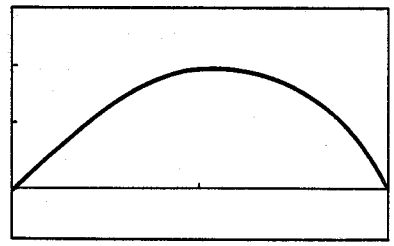
RANGE Xmax: 180  Xmin: 0
       Ymax: 1.5  Ymin: -0.5

F I G. 6A
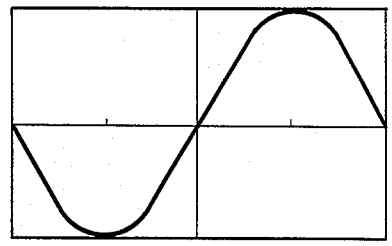
RANGE Xmax: 180   Xmin: -180
      Ymax: 1     Ymin: -1
F I G. 6B
[PLOT] [EXE]
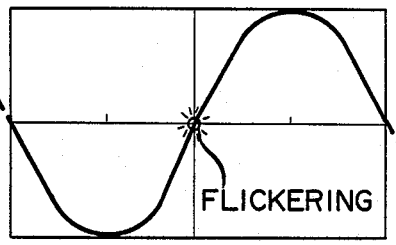
FLICKERING
F I G. 6C
[FACTOR] [0] [.] [5]
FACTOR 0.5
F I G. 6D
[EXE]
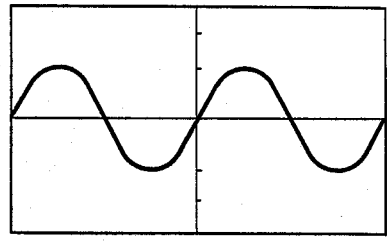
RANGE Xmax: 360   Xmin: -360
      Ymax: 2     Ymin: -2

F I G. 8A 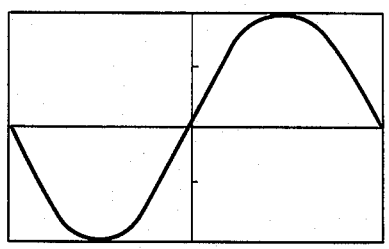
F I G. 8B 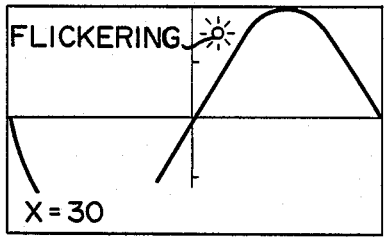
F I G. 8C 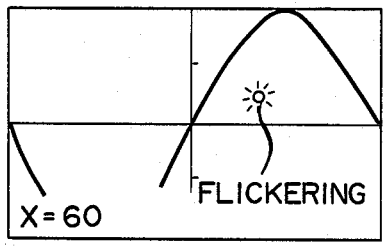
F I G. 8D 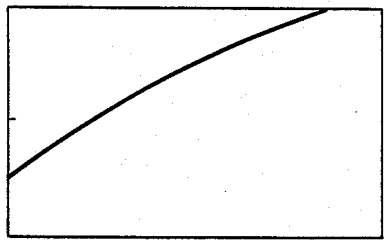

X -30,60  ENLARGEMENT/REDUCTION B

RANGE  Xmin:-30  Xmax:60
       Ymin:-1   Ymax:1

Y 0,1  ENLARGEMENT/REDUCTION B

RANGE  Xmin:-30  Xmax:60
       Ymin: 0   Ymax:1

F I G. 12A
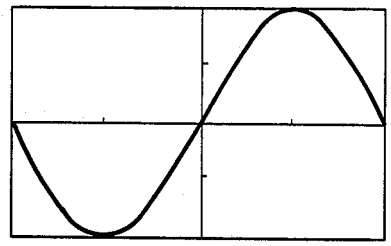
F I G. 12B
[PLOT] -360,2 [EXE]
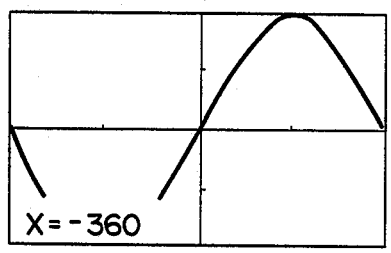
F I G. 12C
[PLOT] 360,-2 [EXE]
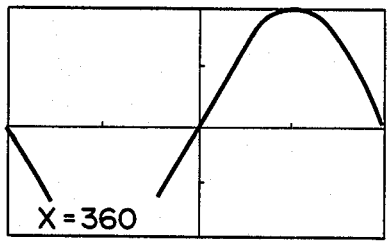
F I G. 12D
[ENLARGEMENT/ REDUCTION A]
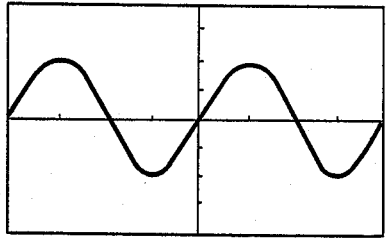

F I G. 13A 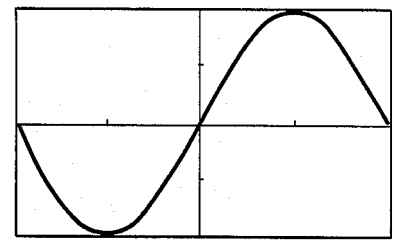
RANGE Xmin -180 Xmax 180
Ymin -1 Ymax 1
F I G. 13B 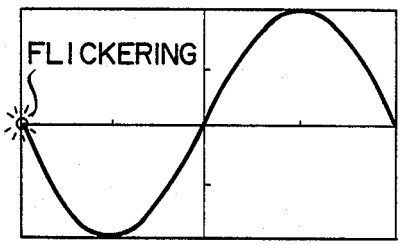
ENLARGEMENT
F I G. 13C 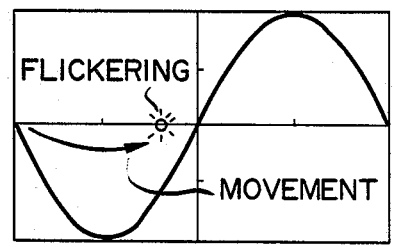
▶---▶ X
(FIRST TIME)
F I G. 13D 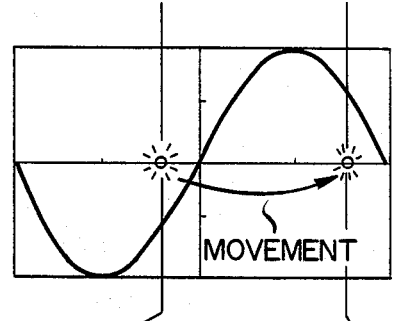
▶---▶
(◀ CAN BE USED)
F I G. 13E 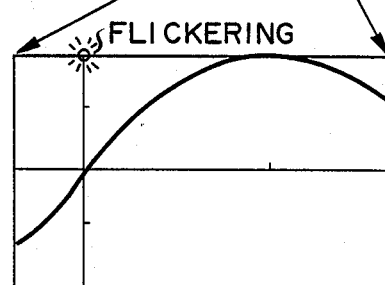
X
(SECOND TIME)

▼---▼ Y
(FIRST TIME)

▼---▼
(▲CAN BE USED)

EQUAL TO EACH OTHER

ENLARGED

Y
(SECOND TIME)

F I G. 16A
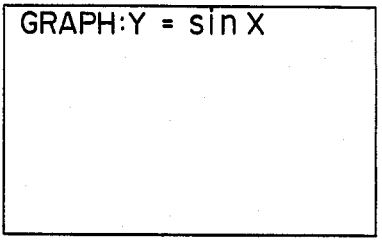
F I G. 16B
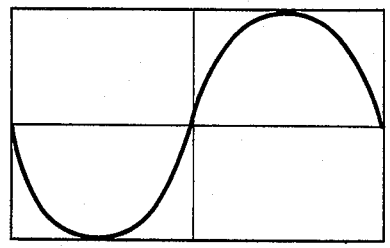
F I G. 16C
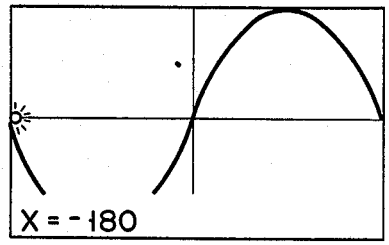
F I G. 16D
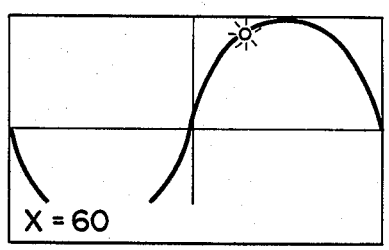

ENLARGEMENT

REDUCTION

ENLARGEMENT

REDUCTION

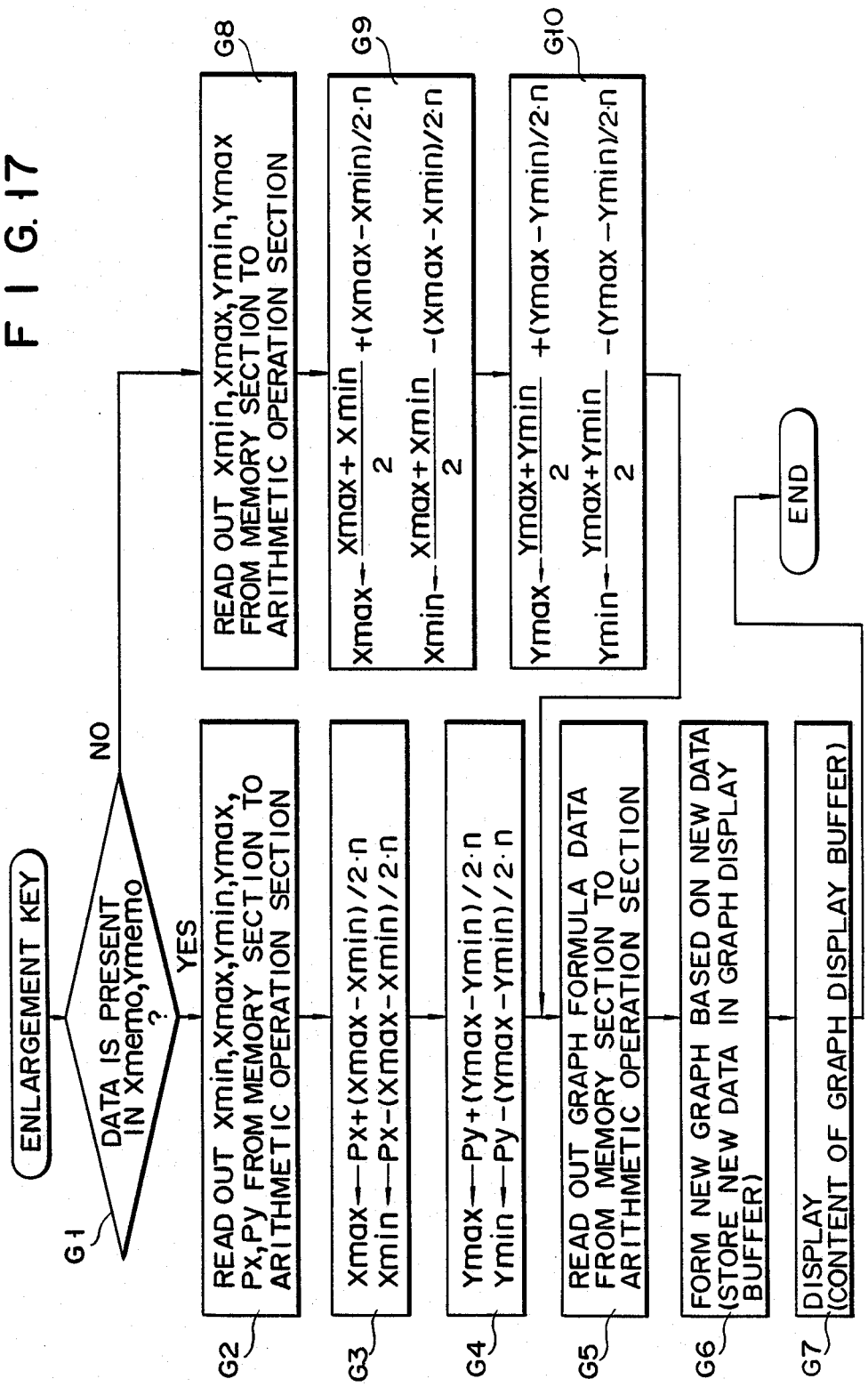

F I G. 19A
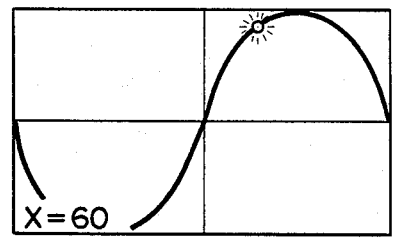
F I G. 19B
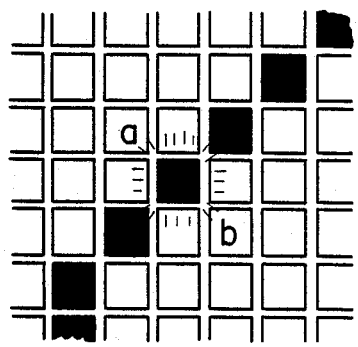
F I G. 19C
[ENLARGEMENT]
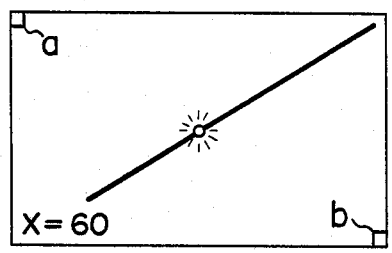

F I G. 20
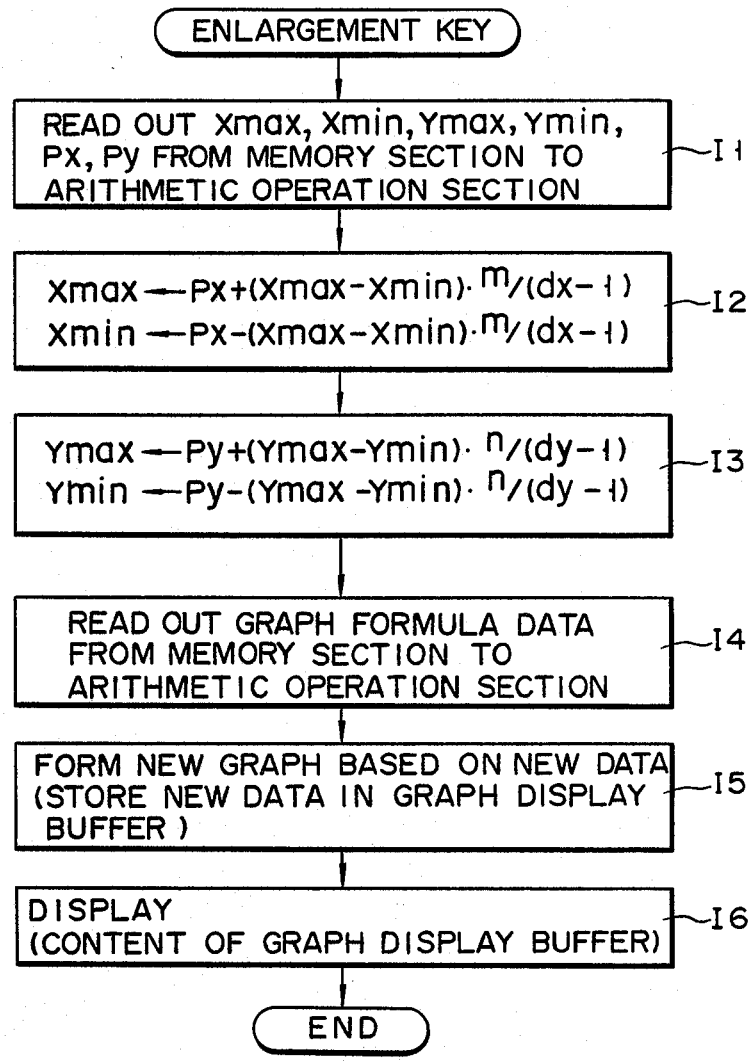

[REDUCTION]

[REDUCTION]

F I G. 25
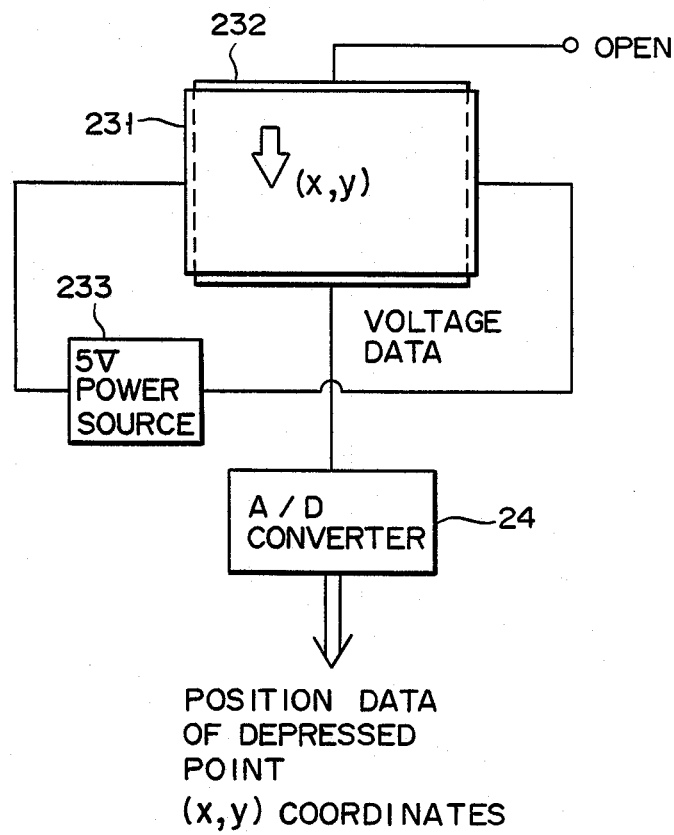

F I G. 26A
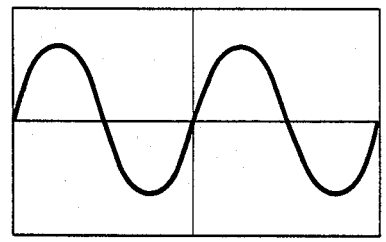
F I G. 26B
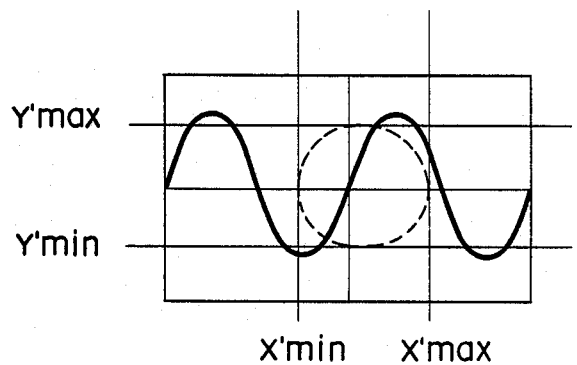
F I G. 26C
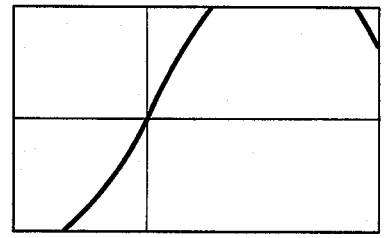

ENTIRE RANGE BEFORE
OPERATION OF REDUCTION
KEY

F I G. 28B
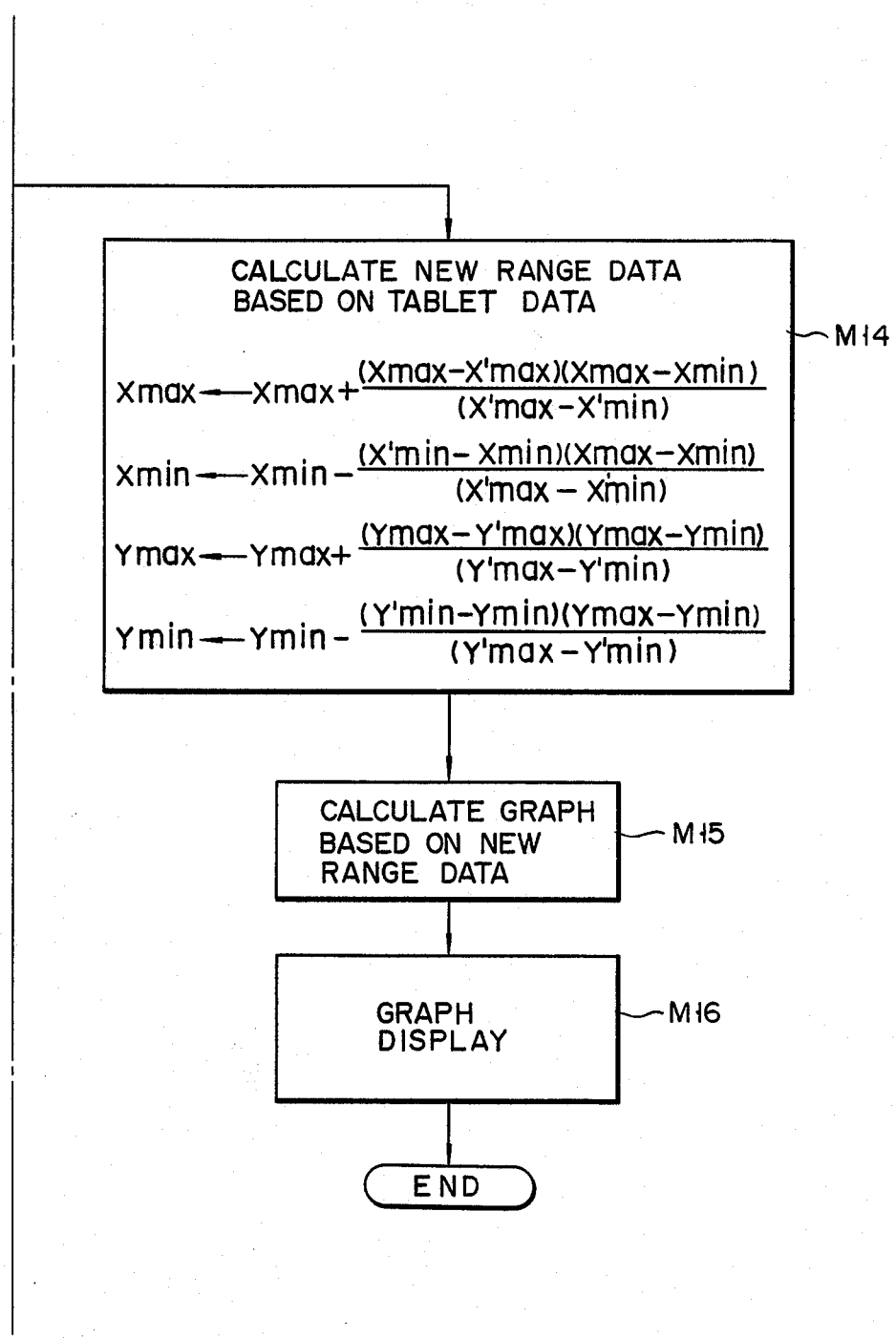

4,794,554

ELECTRONIC CALCULATOR HAVING A GRAPH DISPLAY FUNCTION

BACKGROUND OF THE INVENTION

The present invention relates to an electronic calculator having a graph display function, for converting a functional formula into a graph and displaying it via a simple key operation.

In conventional electronic calculators (e.g., personal computers, pocket computers, and the like), a program is created using BASIC language or the like, and data (e.g., functional formulas and numerals) is then input to display a graph. Alternatively, when a formula is input, each calculation result is represented by one dot on a display section, and a plurality of dots form a graph display thereon.

However, among the above-mentioned conventional electronic calculators, the former requires a special-purpose program for displaying a graph, and an unskilled operator cannot execute a graph display with ease. In addition, since the latter does not store the displayed data in a memory, enlargement or reduction of the displayed graph cannot be performed.

SUMMARY OF THE INVENTION

The present invention has been made in consideration of the above situation, and has as its object to provide an electronic calculator having a graph display function, which can enlarge or reduce a displayed graph using a specified point or region as a central point, via a simple key operation.

It is another object of the present invention to provide an electronic calculator having a graph display function, in which the range of a graph to be enlarged or reduced, and a magnification thereof, can be selected via a simple key operation to enlarge or reduce the graph displayed on the display section.

According to the present invention, range data for specifying a range of a displayed graph, factor data for specifying an enlargement/reduction magnification, plot data for specifying the central point of the displayed graph to be enlarged or reduced, and the like, are stored in a memory, and displayed graph data is converted in accordance with the storage content of the memory, to display an enlarged or reduced graph. Therefore, an electronic calculator having a graph display function and excellent operability, in which a graph enlargement/reduction display can be freely executed via a simple key operation, and with which a user can enlarge or reduce a graph, using desired coordinates as the central point, can be provided.

When an input state of the range of a displayed graph is set by various key operations, to specify two points on the screen of a display section, enlargement/reduction range data can be calculated from the coordinate data of the two specified points, and the displayed graph can be enlarged or reduced in accordance with the calculated range data. Therefore, an electronic calculator having a graph display function and excellent operability, in which an optimal method is selected from various methods to perform enlargement/reduction of a displayed graph via a simple key operation, can be provided.

When only a key for designating an enlargement/reduction mode is operated, the designated mode can be executed using a preset magnification, with reference to the coordinates of a pointer when it is displayed on a display screen, or with reference to the central coordinates of the displayed coordinates, when the pointer is not displayed thereon. Therefore, an electronic calculator having a graph display function, in which a graph displayed on a display section can be enlarged or reduced via a simple key operation, without cumbersome key inputs, can be provided.

In additon, upon key input for designating an enlargement/reduction mode, new range data is calculated from current range data, and maximum and minimum coordinate data in the X and Y directions of a range consisting of a plurality of dots, with a pointer displayed on the screen of a dot-matrix display section as the central point (e.g., coordinate data of vertices of a rectangle, or square, having the pointer as its central point), and a displayed graph is enlarged or reduced in accordance with the calculated range data. Therefore, an electronic calculator having a graph display function, in which a graph displayed on a display section can be enlarged or reduced, using the pointer as the central point, via a simple key operation, can be provided.

Moreover, a tablet input section of a transparent member for detecting coordinate data of an operation position, upon depression thereof, is provided in the display section. A coordinate range of the display section is specified using the tablet input, so that new range data is calculated from the specified coordinate data and key input designating an enlargement/reduction mode, thus enlarging or reducing a graph accordingly. Therefore, in an electronic calculator having a graph display function, the range of a graph to be enlarged or reduced and a magnification thereof, can be selected via a simple key operation to enlarge or reduce the graph displayed on the display section.

In order to achieve the above objects, there is provided an electronic calculator having a graph display function, comprising:

formula input means for inputting a desired formula for graph display;

formula storage means for storing the formula input from said formula input means;

range data storage means for storing a display range of a formula to be displayed;

arithmetic operation means for sequentially obtaining values of a dependent variable, with respect to an independent variable, based on the formula stored in said formula storage means and range data stored in said range data storage means;

display means for displaying a graph based on data calculated by said arithmetic operation means; and range changing means for changing the range data stored in said range data storage means, in order to enlarge or reduce a graph displayed on said display means.

BRIEF DESCRIPTION OF THE DRAWINGS

FIG. 1 is a block diagram of an electronic calculator according to a first embodiment of the present invention;

FIGS. 2A through 2D are illustrations showing key operations and enlarged display states of a display section corresponding thereto;

FIG. 3 is a flow chart showing processing corresponding to the operation of an execution key when a central point is designated;

FIGS. 5A and 5B are illustrations showing key operations and enlarged display states of the display section corresponding thereto, when a specific central point is designated and different magnifications are designated along the X and Y axes;

FIGS. 6A through 6D are illustrations showing key operations and reduced display states of the display section corresponding thereto;

FIGS. 8A through 8F are illustrations showing key operations and graph enlargement display states on a display section, in accordance with first and second methods corresponding thereto;

FIGS. 12A through 12D are illustrations showing key operations and graph reduction display states on the display section, in accordance with the first method corresponding thereto;

FIGS. 13A through 13H are illustrations showing key operations and graph enlargement display states on the display section, in accordance with a third method corresponding thereto;

FIGS. 16A through 16H are illustrations showing key operations and states of a display section corresponding thereto;

FIG. 17 is a flow chart showing processing content corresponding to the operation of an enlargement key;

FIGS. 19A through 19C are illustrations showing key operations for enlargement display, and states of a display section corresponding thereto, according to a fourth embodiment of the present invention;

FIG. 20 is a flow chart of processing content corresponding to the operation of an enlargement key;

FIG. 25 is a diagram showing a detailed arrangement of a tablet input section and related elements;

FIGS. 26A through 26E are illustrations showing key operations and states of a display section corresponding thereto;

FIGS. 28A and 28B are flow charts showing reduction processing of a displayed graph.

DETAILED DESCRIPTION OF THE PREFERRED EMBODIMENTS

Figure 4A:
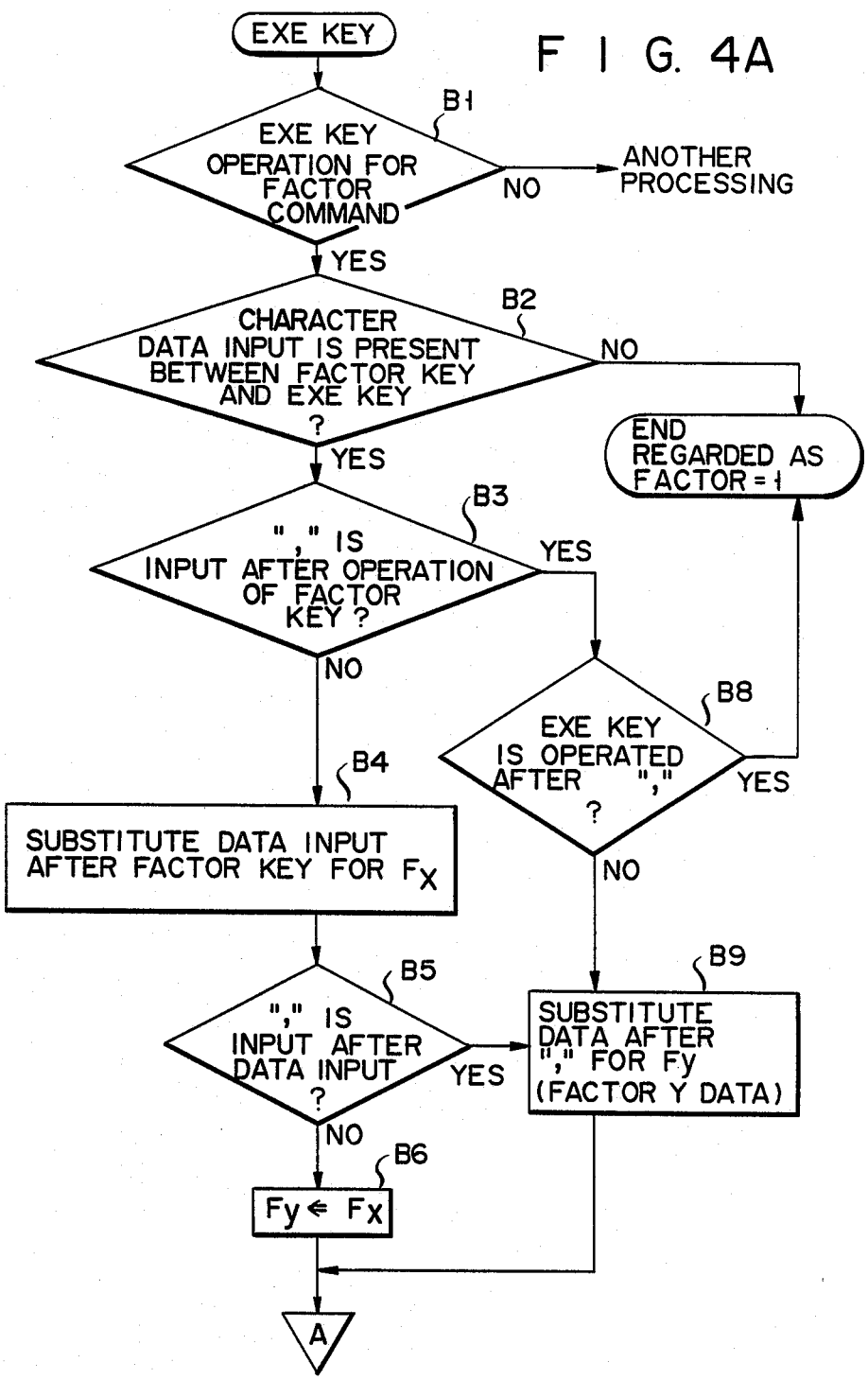
FIGS. 4A and 4B are flow charts showing processing corresponding to the operation of the execution key when a magnification is designated.

A first embodiment of the present invention will now be described with reference to the accompanying drawings. FIG. 1 shows a circuit configuration of an electronic calculator according to the first embodiment of the present invention. Referring to FIG. 1, reference numeral 11 denotes a key input section, which comprises numeric keys 11a for inputting numeric data, function keys 11b for specifying operation content, formula keys 11c for inputting formula data representing formulas for graph display, Plot key 11d for inputting the enlargement/reduction central point of a displayed graph, Factor key 11e for specifying an enlargement/reduction magnification, and execution key 11f (in the drawings, indicated by "EXE") for executing graph display. When any of these keys is operated, the key operation data is supplied to control section 12. Control section 12 controls the entire circuit in accordance with the key operation data from section 11, and respectively supplies control data to text display buffer 13 for storing coordinate data of a display pointer of a graph, graph display buffer 14 for storing display data of a graph, arithmetic operation section 15 for performing various arithmetic operations for graph display, execution pointer 16 for assigning addresses of a formula buffer (to be described later), and memory section 17 consisting of a RAM and the like. Memory section 17 comprises graph formula register 17a for storing formulas to be displayed as a graph; Px register 17b and Py register 17c for storing enlargement/reduction central point data input upon operation of Plot key 11d; Fx register 17d and Fy register 17e for storing an enlargement/reduction magnification input upon operation of Factor key 11e; X register 17f for storing X-coordinate data of the display pointer; Y register 17g for storing Y-coordinate data of the display pointer; Xmin register 17h, Xmax register 17i, Ymin register 17j, and Ymax register 17k for storing range data; Xmemo register 17l for storing a value of X substituted in a formula; and Ymemo register 17m for storing a value of Y substituted in a formula.

Memory section 17 performs data communication with arithmetic operation section 15 in response to a control command from control section 12. Section 15 performs data communication with formula buffer 18 for storing formula data upon instruction from execution pointer 16, as well as from memory section 17, to perform an arithmetic operation for changing a range and displaying the pointer and its coordinate data, and supplies the operation result to buffers 13 and 14. Buffer 13 stores the coordinate data of the display pointer, and buffer 14 stores the display data of the graph and the pointer, and this storage data is supplied to display section 19. Display section 19 has a 64×96 dot-matrix configuration consisting of liquid-crystal display elements, and displays a graph, a pointer on a graph line, coordinate data of the pointer, and the like, based on the data supplied from buffers 13 and 14.

The operation of the electronic calculator according to this embodiment will now be described. FIGS. 2A through 2D show key operations and states of display section 19 corresponding thereto, and assume that the following formula shown in FIG. 2A is initially displayed on display section 19:

$$y = \sin x$$

A graph can be displayed based on input formulas or range data, upon operation of numeric keys 11a, function keys 11b, or formula keys 11c of key input section 11. In this state, the above formula data "y=sin x" is stored in formula buffer 18, and X-axis range data, e.g., "−180" and "180", are respectively input to Xmin and Xmax registers 17h and 17i, and Y-axis range data, e.g., "−1" and "1", are respectively input to Ymin and Ymax registers 17j and 17k.

When Plot key 11d and EXE key 11f are sequentially operated as shown in FIG. 2B, processing shown in FIG. 3, in response to this operation of key 11f, is performed. More specifically, referring to FIG. 3, a check is made step A1 whether this key input is a Plot command, i.e., if EXE key 11f is operated after the operation of Plot key 11d. If NO, in step A1, other processing is performed in accordance with the key operated prior to EXE key 11f. In this case, since YES is obtained in step A1, the flow advances to step A2 to check if data is input after the operation of Plot key 11d. The data input after the operation of key 11d is for specifying an enlargement/reduction central point. In this case, since NO is obtained in step A2, the flow advances to step A3. More specifically, when no data is input after the operation of Plot key 11d, the enlargement/reduction central point is automatically set at the central position of display section 19, and in step A3, the X-coordinate of the central position of display section 19 is calculated. In this case, the central position is calculated using the following formula (1), based on X-axis range data "Xmin" and "Xmax" stored in registers 17h and 17i:

$$(Xmax+Xmin)/2 \qquad (1)$$

The operation result is input to Px register 17b for storing the X-coordinate of the enlargement/reduction central point. In this case, since Xmax=180 and Xmin=180, $$[180+(-180)]2=0$$

Therefore, "0" is input ot Px register 17b. After the operation for obtaining the X-coordinate of the enlargement/reduction central point, in step A3, the Y-coordinate thereof is obtained in step A4. Similarly, the central point is obtained using the following formula (2) based on Y-axis range data stored in Ymin and Ymax registers 17j and 17k:

$$(Ymax+Ymin)/2 \qquad (2)$$

The operation result is input to Py register 17c for storing the Y-coordinate of the enlargement/reduction central point. In this case, since Ymax=1 and Ymin=−1, $$[1+(-1)]/2=0$$

Therefore, "0" is also input to register 17c. The coordinates of the enlargement/reduction central point are thus (0,0) (i.e., the origin). Next, in step A5, the storage contents of registers 17b and 17c for storing the central point data are input to Xmemo and Ymemo registers 17l and 17m for storing pointer data. In step A6, control section 12 selects display data at a position corresponding to the storage data in registers 17l and 17m, from the storage data in buffer 14, and supplies flickering data. Thereafter, in step A7, a dot at the position corresponding to the selected display data is flickered in display section 19, and the characters "X=0" as the coordinate data of the flickering dot are displayed on the lower portion of the screen thereof, thus completing the processing corresponding to the operation of EXE key 11f.

As shown in FIG. 2C, when numeric data "2" is input as a magnification factor after Factor key 11e is operated to designate enlargement/reduction data substitution, character data is written in text display buffer 13, from control section 12, and the characters "Factor 2" are displayed on the upper portion of the screen of display section 19, in accordance with the character data.

Figure 4B:
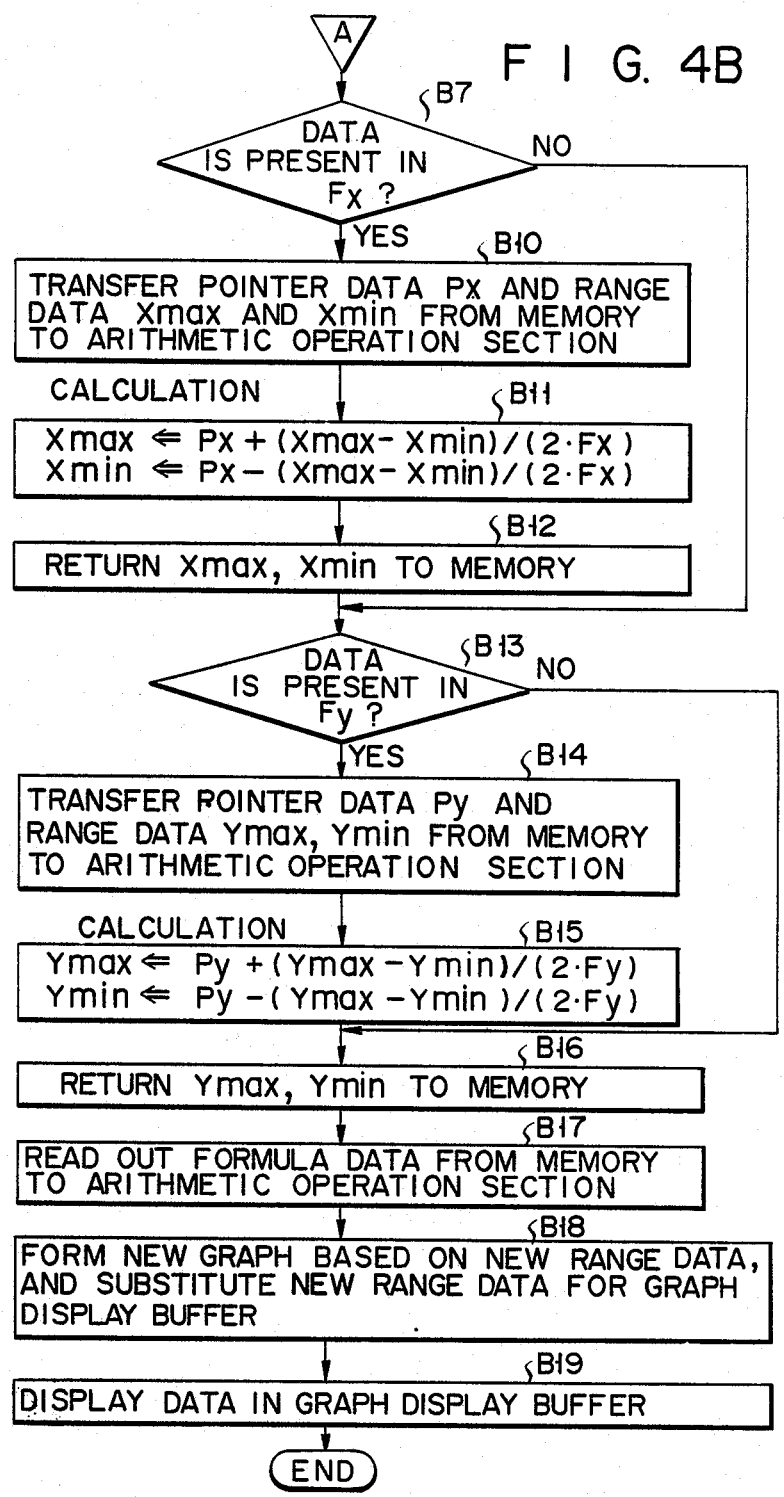

Next, when EXE key 11f is operated to execute graph enlargement/reduction in accordance with the input factor data, as shown in FIG. 2D, processing shown in FIGS. 4A and 4B is executed upon this key operation. A check is made in step B1 whether the key input is a Factor command, i.e., if EXE key 11f is operated after the operation of Factor key 11e. If NO, in step B1, other processing is executed in accordance with the key operated before the operation of EXE key 11f. In this case, since YES is obtained in step B1, the flow advances to step B2 to check if other character data is input after the operation of Factor key 11e. The data input after Factor key 11e indicates vertical and horizontal enlargement/reduction magnifications. If NO, in step B2, since no enlargement/reduction magnification is input, the input factor is regarded as "1" (i.e., a graph is displayed at normal size), and this processing is ended. In this case, the numeric data "2" is input. Therefore, YES is obtained in step B2, and the flow advances to step B3. A check is made, in step B3, whether the character data input immediately after the operation of Factor key 11e is ",". In this case, since the character data immediately after the operation of Factor key 11e is "2", NO is obtained in step B3, and the flow advances to step B4. In step B4, the numeric data "2", as the character data input immediately after the operation of Factor key 11e, is set in Fx register 17d for storing horizontal enlargement/reduction magnification (in the X direction) data. Thereafter, a check is made, in step B5, whether the character data input immediately after the horizontal magnification input is ",", indicating a division code, i.e., if numeric data indicating the vertical magnification (in the Y direction) is input in addition to that of the horizontal magnification. Since "," is not input after the numeric data "2" in this case, the numeric data "2" set in Fx register 17d is also set in Fy register 17e, and the flow then advances to step B7.

Note that if it is determined, in step B3, that the character data immediately after Factor key 11e ",", since this means that horizontal magnification input is omitted, no data is input to register 17d, and a check is made, in step B8, whether EXE key 11f is operated after "," is input. If YES, in step B8, the magnification factor is regarded as "1", i.e., graph display is performed at normal size, and the processing is ended. However, if NO, in step B8, numeric data indicating the vertical magnification input after "," is set in register 17e, and the flow then advances to step B7.

A check is made, in step B7, whether any data indicating the horizontal magnification is set in register 17d. If NO, in step B7, no horizontal magnification data is set and, therefore, enlargement/reduction in the horizontal direction is not performed. The flow then jumps to step B13 without executing steps B10 through B12. However, in this case, since the numeric data "2" is set, YES is obtained in step B7, and the flow advances to step B10. In step B10, X-coordinate data of the enlargement/reduction central point stored in register 17h, and X-coordinate range data stored in registers 17h and 17i are read out by arithmetic operation section 15. In step B11, an arithmetic operation is performed to obtain new range data when a displayed graph is enlarged or reduced using these data. These formulas are as follows:

$$X\max = Px + (X\max - X\min)/(2 \cdot Fx) \quad (3)$$

$$X\min = Px - (X\max - X\min)/(2 \cdot Fx) \quad (4)$$

In this case, since Px=0, Xmax=180, Xmin=−180, and Fx=2, new range data is obtained by:

$$X\max = 0 + [180 - (-180)]/(2 \times 2)$$

$$X\min = 0 - [180 - (-180)]/(2 \times 2)$$

As a result, Xmax=90 and Xmin=−90. These operation results respectively update the contents of registers 17h and 17i, and the flow then advances to step B13.

A check is made, in step B13, whether data for designating the vertical magnification is set in register 17e. If NO, in step B13, since no vertical magnification data is set and, therefore, enlargement/reduction in the vertical direction is not performed, the flow jumps to step B17 without executing steps B14 through B16. In this case, since the numeric data "2" is set, YES is obtained in step B13, and the flow advances to step B14. In steps B14 through B16, the same operation as in steps B10 through B12 is performed to update the Y-coordinate range data. In step B14, Y-coordinate data of the enlargement/reduction central point, stored in register 17c of memory section 17, and Y-coordinate range data stored in registers 17j and 17k are read out by arithmetic operation section 15, and an arithmetic operation is performed, in step B15, to obtain new range data when a displayed graph is enlarged or reduced, based on these data. These formulas are as follows:

$$Y\max = Py + (Y\max - Y\min)/(2 \cdot Fy) \quad (5)$$

$$Y\min = Py - (Y\max - Y\min)/(2 \cdot Fy) \quad (6)$$

In this case, since Py=0, Ymax=1, Ymin=−1, and Fy=2, new range data is obtained by:

$$Y\max = 0 + [1 - (-1)]/(2 \times 2)$$

$$Y\min = 0 - [1 - (-1)]/(2 \times 2)$$

As a result, Ymax=0.5 and Ymin=−0.5. These operation results update the storage data of registers 17j and 17k of memory section 17.

After the range data is updated, a graph is displayed in accordance with the updated range data. More specifically, in step B17, formula data is read out from graph formula register 17a, of section 17, by section 15, a graph display data corresponding to the new range data is calculated in step B18. Then, the operation result is stored in graph display buffer 14. Thereafter, in step B19, the enlarged graph shown in FIG. 2D is displayed in display section 19, based on the new graph display data, thus completing the processing corresponding to the operation of EXE key 11f.

In the above descriptions, the central point of display section 19 is used as the enlargement/reduction central point, and input of the coordinates thereof is omitted. In addition, the enlargement/reduction magnification factors in the vertical and horizontal directions are both set at "2", and numeric data is input only once.

Next, the operation where the coordinates of a central point are input and the vertical and horizontal magnifications are input separately, will be described with reference to FIGS. 5A and 5B. As shown in FIG. 5A, in order to input the coordinates of the central point, Plot key 11d is operated and, subsequently, "90", ",", and "0.5" are input by numeric keys 11a. When EXE key 11f is then operated, after it is determined in step A1 in FIG. 3 that the key input is the Plot command, it is then determined, in step A2, that the character data is input after the operation of Plot key 11d. Then, the flow advances to step A8. A check is made, in step A8, whether the character data input after the operation of Plot Key 11d is ",". If YES, in step A8, since input of the X-coordinate data of the central point is omitted, the flow advances to step A3, and the coordinates of the central point of the X-coordinate range data are calculated and input to register 17b. In this case, however, since the character data input immediately after the operation of Plot key 11d is not "," but "90", the flow advances to step A9, and the numeric data "90" is input to register 17b. After step A9 (or step A3), a check is made, in step A10, whether EXE key 11f is operated after "," is input. If YES, in step A10, since input of the Y-coordinate data is omitted, the flow advances to step A4, and the coordinates of the central point of the Y-coordinate range data is calculated and input to register 17c. In this case, however, since the key operated after the input of "," is not EXE key 11f but keys for "0.5", the flow advances to step A11, and numeric data "0.5" is input to register 17c. After step A11 (or step A4), the storage contents of registers 17b and 17c are input to registers 17l and 17m, respectively, in step A5. In step A6, control section 12 selects display data (in buffer 14) at a position corresponding to the storage data of registers 17l and 17m, and supplies flickering data. In step A7, a dot at position (90,0.5), corresponding to the selected display data, is flickered on the screen of display section 19, and the characters "X=90" are displayed on the lower portion thereof as the coordinate data of the flickering dot, thus completing the processing upon operation of EXE key 11f, after Plot key 11d is operated.

Next, as shown in FIG. 5B, in order to designate the enlargement/reduction magnification factor, Factor key 11e is operated and, subsequently, "2", ",", and "1" are input by numeric keys 11a. When EXE key 11f is then operated, after it is determined in step B1 in FIG. 4A that the key input is a Factor command, it is then determined, in step B2, that character data input immediately after Factor key 11e is operated, and the flow then advances to step B3. After it is determined, in step B3, that character key "," is not operated immediately after Factor key 11e is operated, data "2", input immediately after the operation of key 11e, is input to register 17d, as the horizontal magnification. Thereafter, since it is determined, in step B5, that the input data after "2", is ",", the flow advances to step B9. In step B9, "1" input after "," is input to register 17e as the vertical magnification. After it is determined, in step B7, that register 17d stores input data, the following arithmetic operations are performed using formulas (3) and (4) described above, for obtaining new X-coordinate range data:

$$X\text{max}=90+[180-(-180)]/(2\times 2)$$

$$X\text{min}=90-[180-(-180)]/(2\times 2)$$

In step B19, the operation results Xmax=180 and Xmin=0 are stored in registers 17h and 17i as new range data. Next, after it is determined, in Step B13, that input data is stored in register 17e, the following arithmetic operations are made using formulas (5) and (6) for obtaining new Y-coordinate range data:

$$Y\text{max}=0.5+[1-(-1)]/(2\times 1)$$

$$Y\text{min}=0.5-[1-(-1)]/(2\times 1)$$

As a result, Ymax=1.5 and Ymin=−0.5 are stored in registers 17j and 17k as new range data in step B16. After updating of the range data, graph display is performed based on the updated range data. In step B17, formula data is read out from graph formula register 17a, of memory section 17, to arithmetic operation section 15, and graph display data corresponding to the range data is calculated, in step B18. Thereafter, the calculated result is stored in graph display buffer 14. In step B19, the enlarged graph shown in FIG. 5B is displayed in display section 19, based on the graph display buffer input to buffer 14, thus completing processing corresponding to the operation of EXE key 11f.

In this embodiment, a case has been exemplified wherein a displayed graph is enlarged. However, the displayed graph can be reduced by the same operation, by inputting numeric data smaller than 1 as a magnification factor.

The graph reduction display will be briefly described with reference to FIGS. 6A to 6D. Assume that, as shown in FIG. 6A, display section 19 is in the same state as in FIG. 2A. In this state, X-coordinate range data "180" and "−180" are input to Xmin and Xmax registers 17h and 17i, and Y-coordinate range data "1" and "−1" are input to Ymin and Ymax registers 17j and 17k.

As shown in FIG. 6B, when Plot key 11d and EXE key 11f are operated in the same manner as in FIG. 2B, since no numeric data is input, the central point of display section 19 is designated as the enlargement/reduction central point. Upon operation of EXE key 11f, X-coordinate data "0" and Y-coordinate data "0" of central point coordinates (0,0) are input to Px and Py registers 17b and 17c, respectively, and the central point of section 19 is flickered.

As shown in FIG. 6C, when Factor key 11e is operated and numeric data "0.5" is then input, the characters "Factor 0.5" are displayed on the upper left corner of the screen of section 19 as enlargement/reduction magnification factor.

When EXE key 11f is operated as shown in FIG. 6D, "0.5" is input as the horizontal magnification factor to Fx register 17d, in step B4, via steps B1 through B3, as shown in FIGS. 4A and 4B and, thereafter, "0.5" is also input as the vertical magnification factor to Fy register 17e, in step B6, via step B5. After steps B7 and B10, X-coordinate range data is calculated in step B11:

$$X\text{max}=0+[180-(-180)]/(2\times 0.5)$$

$$x\text{min}=0-[180-(-180)]/(2\times 0.5)$$

In step B12, new range data Xmax=360 and Xmin=−360 are input to Xmin register 17h and Xmax register 17i, respectively. After step B13, new Y-coordinate range data is calculated through Fy register 17e:

$$Y\text{max}=0+[1-(-1)]/(2\times 0.5)$$

$$Y\text{min}=0-[1-(-1)]/(2\times 0.5)$$

As a result, new range data Ymax=2 and Ymin=−2 are input to registers 17j and 17k, respectively, in step B16. After updating the range data, graph display is performed, based on the updated range data. In step B17, formula da a is read out from graph formula register 17a, of memory section 17 to arithmetic operation section 15, and graph display data corresponding to the range data is calculated using the readout formula data in step B18. The calculated result is then stored in graph display buffer 14. In step B19, a reduced graph shown in FIG. 6D is displayed on display section 19 using new graph display data input to graph display buffer 14, thus completing processing corresponding to the operation of EXE key 11f.

In this embodiment as described above, when numeric data larger than "1" is input as a magnification factor, a displayed graph is enlarged. When numeric data smaller than "1" is input, the displayed graph is reduced. The enlargement/reduction central point can be designated, and vertical (Y-axis) and horizontal (X-axis) magnifications can be separately designated.

Figure 7:
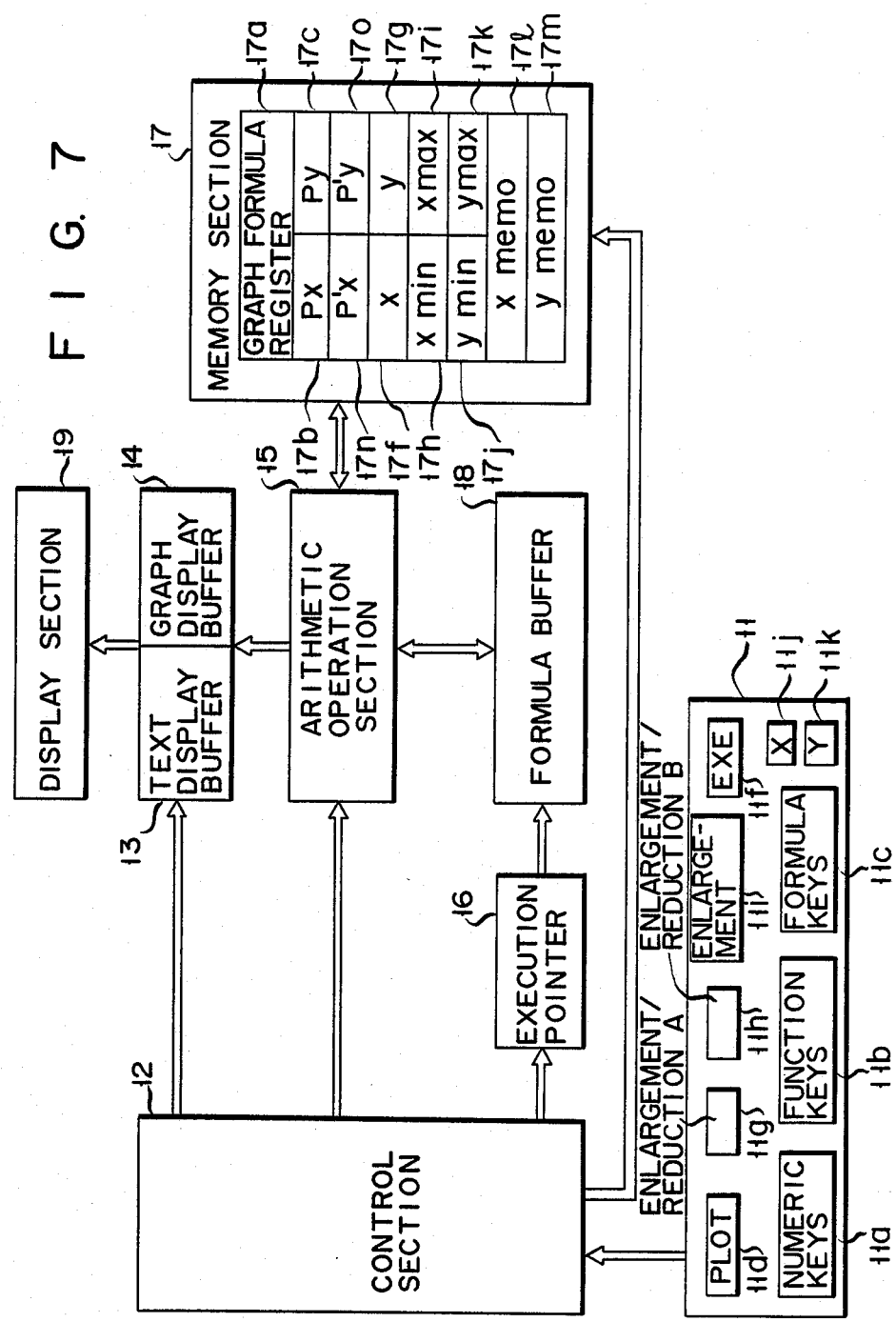
FIG. 7 is a block diagram of an electronic calculator according to a second embodiment of the present invention.

FIG. 7 is a block diagram of a second embodiment of the present invention. Note that the same reference numerals in FIG. 7 denote the same parts as in FIG. 1, and a detailed description thereof will be omitted.

In this embodiment, key input section 11 further includes X key 11j for inputting enlargement/reduction X-coordinate range data, Y key 11k for inputting Y-coordinate range data, enlargement/reduction A key 11g for inputting coordinate data of diagonal points in a display range, to perform enlargement or reduction, enlargement/reduction B key 11h for inputting range data, using X and Y keys 11j and 11k to perform enlargement or reduction, and enlargement key 11i for moving a flickering pointer along coordinate axes, to input range data of the display range to be enlarged. In addition, memory section 17 comprises P'x register 17n and P'y register 17o instead of Fx register 17d and Fy register 17e.

The operation of the apparatus of the second embodiment will now be described. FIGS. 8A through 8D show key operations and corresponding display states of display section 19. As shown in FIG. 8A, assume that a graph corresponding to the following formula and the X- and Y-axes as coordinate axes are initially displayed in section 19:

$$y = \sin x$$

This graph is displayed by inputting formula and range data using numeric keys 11a, function keys 11b, and formula keys 11c. In this state, formula buffer 18 stores formula data "y=sin x", Xmin and Xmax registers 17h and 17i stores X-coordinate range data "−180" and "180", and Ymin and Ymax registers 17j and 17k store Y-coordinate range data "−1" and "1".

Figure 8E:
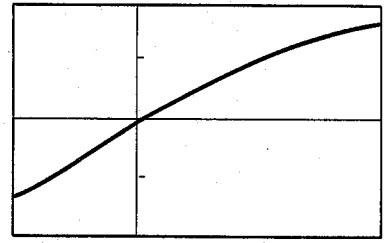
Figure 9:
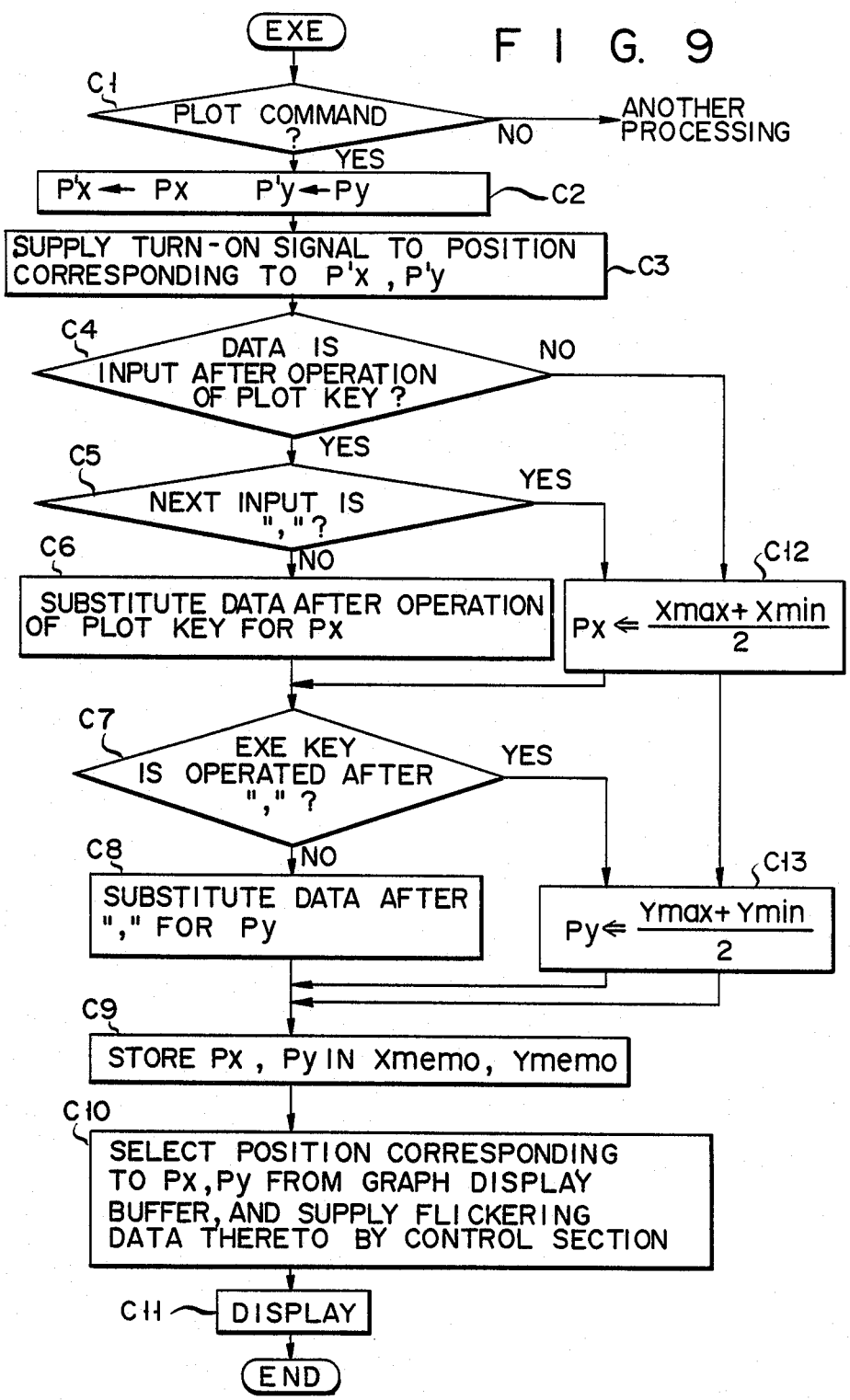
FIG. 9 is a flow chart of processing corresponding to the operation of an execution key.

As shown in FIG. 8B, Plot key 11d is operated in order to input coordinate data (30,0.7), and "30", ",", and "0.7" are then input using numeric keys 11a and function keys 11b. When EXE key 11f is subsequently operated, processing corresponding thereto is performed, as shown in FIG. 9. More specifically, referring to FIG. 9, a check is made, in step C1, whether the key input corresponds to a Plot command, i.e., if EXE key 11f is operated after the operation of Plot key 11d. If NO, in step C1, other processing, corresponding to the key operation before that of EXE key 11f, is performed. However, in this case, since EXE key 11f is operated after Plot key 11d and YES is obtained in step C1, the flow advances to step C2. In step C2, the coordinate data stored in Px and Py registers 17b and 17c are respectively transferred to P'x and P'y registers 17n and 17o. However, in this case, since no data is stored in Px and Py registers 17b and 17c, no coordinate data is transferred to P'x and P'y registers 17n and 17o. Next, in step C3, a turn-on signal is supplied to an address corresponding to coordinates (P'x,P'y) of graph display buffer 14, based on coordinate data (P'x,P'y) input to registers 17n and 17o in step C2. As described above, since no coordinate data is input to registers 17n and 17o, the turn-on signal is not supplied to buffer 14. A check is made, in Step C4, whether any data is input after the operation of Plot key 11d. Since coordinate data "30" is input, YES is obtained in step C4 and the flow advances to step C5. A check is then made, in step C5, whether the data input immediately after Plot key 11d is ",", i.e., if inputting of X-coordinate data is omitted. Since NO is obtained in step C5, the coordinate data "30", input after Plot key 11d, is stored in Px register 17b in step C6. Next, a check is made, in step C7, whether EXE key 11f is operated after data "," subsequent to coordinate data "30", i.e., if inputting of the Y-coordinate data is omitted. Since NO is obtained in step C7, coordinate data "0.7", after data "," is stored in Py register 17c in step C8. In this way, inputting of coordinate data designated by the operation of Plot key 11d is completed. In step C9, coordinate data (30,0.7), stored in registers 17b and 17c, is supplied to Xmemo and Ymemo registers 17l and 17m for text display of a pointer. Thereafter, in step C10, control section 12 selects an address in graph display buffer 14, corresponding to the input coordinate data, and supplies flickering data to the selected address. In step C11, a graph is displayed on display section 19, to correspond with the content of buffers 14 and 13. In display section 19, a dot at coordinates (P'x,P'y), i.e., (30,0.7), is flickered as a pointer, in addition to the graph shown in FIG. 8B, and the content of Xmemo register 17l is supplied to text display buffer 13, to display a coordinate of the pointer (i.e., "X=30") on the lower portion of the screen.

As shown in FIG. 8C, Plot key 11d is operated in order to input coordinate data (60,0.3) of an orthogonal point with respect to the coordinate data (30,0.7), and "60", ",", and "0.3" are then input using numeric keys 11a and function keys 11b. When EXE key 11f is then operated, processing shown in FIG. 9 is executed accordingly. After YES is obtained in step C1, the coordinate data "30" and "0.7" stored in registers 17b and 17c are transferred to registers 17n and 17o, respectively, in step C2. The turn-on signal is supplied to an address corresponding to the coordinates (30,0.7) of graph display buffer 14, based on the coordinate data "30" and "0.7" stored in registers 17n and 17o. Subsequently, since YES is obtained in step C4, the flow advances to step C5. When NO is obtained in step C5, data "60", input immediately after Plot key 11d, is input to Px register 17b. Since NO is obtained in step C7, the flow advances to step C8, to input data "0.3" to register 17c. The contents of registers 17b and 17c are transferred to registers 17l and 17m in step C9. In step C10, control section 12 selects an address in buffer 14, corresponding to the coordinate data (60,0.3), stored in registers 17b and 17c, and supplies flickering data to the selected address. In step C11, graph display is performed in display section 19, to correspond with the contents of buffers 14 and 13. In this case, a dot corresponding to the coordinates (60,0.3) is flickered as a pointer on display section 19, in addition to the graph shown in FIG. 8A, and the illuminated dot corresponding to the coordinates (30,0.7). The content of register 17l is transferred to buffer 13 to display a coordinate of the pointer (i.e., characters "X=60") on the lower portion of the screen.

Although not described above, when EXE key 11f is operated immediately after Plot key 11d, and no coordinate data is input, the pointer is plotted at the central point of display section 19, and inputting of coordinate data is omitted. Therefore, the flow advances from step C4 to step C12, and the following arithmetic operation (indicated by (1) in the above descriptions) is performed using range data "Xmin" and "Xmax", stored in registers 17h and 17i:

$$(Xmin + Xmax)/2$$

The operated result is stored in register 17b as the X-coordinate data of the central point of display section 19. The flow then advances to step C13, and the following arithmetic operation (indicated by (2) in the above descriptions) is performed using Y-coordinate range data stored in registers 17j and 17k:

$$(Ymax + Ymin)/2$$

The operated result is stored in register 17c as the Y-coordinate data of the central point of section 19. After the coordinate data is stored in registers 17b and 17c, processing of steps C9 through C11 is performed to display data in display section 19. When it is determined, in step C5, that key input immediately after Plot Key 11d is ",", since the X-coordinate data is omitted, the arithmetic operation shown in step C12 is performed, the operated result is stored in register 17b as the X-coordinate data of the central point of section 19, and the flow then advances to step C7. When it is determined, in step C7, that key input immediately after data "," corresponds to EXE key 11f, inputting of Y-coordinate data is omitted. After the operation in step C13 is performed and the operated result is stored in register 17c, processing of steps C9 through C11 is performed, to display data in display section 19.

Figure 10:
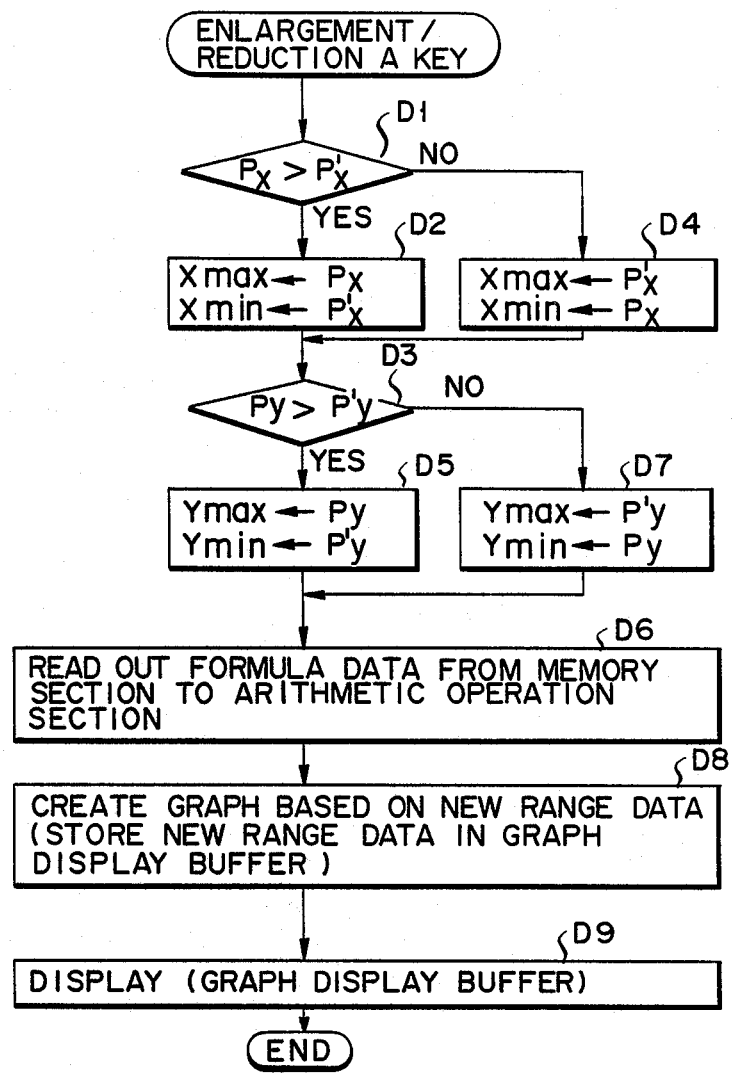
FIG. 10 is a flow chart of processing corresponding to the operation of an enlargement/reduction A key.

As shown in FIG. 8D, when enlargement/reduction A key 11g is operated thereafter, a displayed graph is enlarged or reduced, based on processing shown in FIG. 10. When enlargement/reduction A key 11g is operated, an area of a graph defined by orthogonal points, designated by the operation of Plot key 11d, is enlarged or reduced and is displayed on the entire screen of section 19. A check is made, in step D1, whether the X-coordinate data stored in register 17b is larger than that stored in register 17n. In this case, since the content of register 17b is "60" and that of register 17n is "30", YES is obtained in step D1, and the flow advances to step D2. In step D2, the X-coordinate data "60", stored in register 17b, is input to Xmax register 17i, and the X-coordinate data "30" stored in register 17n is input to Xmin register 17h as new X-coordinate range data, and the flow advances to step D3. However, if it is determined, in step D1, that the X-coordinate data stored in register 17n is larger than that in register 17b, the flow advances to step D4, the data in register 17n is input to register 17i, and that in register 17b is input to register 17h as new range data. The flow then advances to step D3. In order to set new X-coordinate range data, as well as the Y-coordinate range data, a check is made, in step D3, whether the Y-coordinate data stored in register 17c is larger than that in register 17o. If YES is obtained in step D3, the content of register 17c is stored in register 17k and that of register 17o is stored in register 17j, as the new Y-coordinate range data. However, since the content of register 17c is "0.3" and that of register 17o is "0.7", NO is obtained in step D3, and the flow advances to step D7. In step D7, the content of register 17o is stored in register 17k and that of register 17c is stored in register 17j, as the new Y-coordinate range data, in the opposite manner to step D5. In this case, data "0.7" is stored in register 17k and data "0.3" is stored in register 17j.

In this way, the new range data is set, and formula data "y=sin x" is then read out from register 17a to arithmetic operation section 15. In step D8, new display data is calculated by section 15, based on the readout formula data, to form a graph within a range defined by the range data, and the operated result is sequentially input to graph display buffer 14. After necessary data is input to buffer 14, the enlarged graph shown in FIG. 8D is displayed in section 19, based on the display data stored in buffer 14, thus completing processing corresponding to the operation of key 11g.

Figure 11:
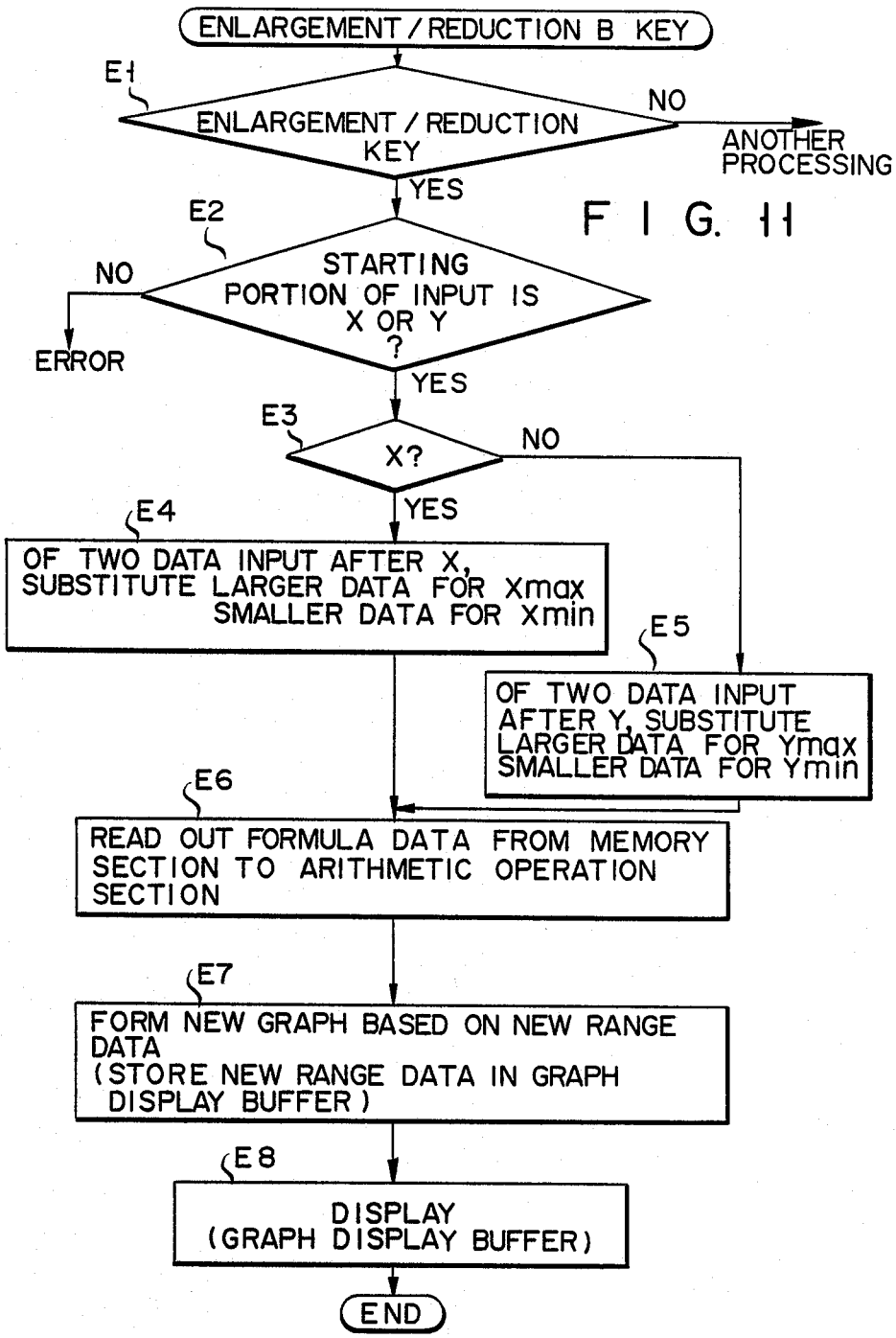
FIG. 11 is a flow chart of processing corresponding to the operation of an enlargement/reduction B key.

In the above descriptions, graph enlargement/reduction display operation, using key 11g, has been described. Next, graph enlargement/reduction display, using enlargement/reduction B key 11h, will be described. Enlargement/reduction B key 11h separately sets X- and Y-coordinate range data in accordance with the operations of X and Y keys 11j and 11k. More specifically, when display section 19 is in the display state shown in FIG. 8A, if key 11h is operated after input of X-coordinate range data is designated by X key 11j, and "−30", ",", and "60" are sequentially input using numeric keys 11a and function keys 11b, processing shown in FIG. 11 is executed. After control section 12 performs key sampling to determine, in step E1, that the key operated is key 11h, a check is made, in step E2, whether the first key operated is X key 11j or Y key 11k. If NO, in step E2, since X- and Y-coordinates cannot be designated and graph enlargement/reduction display, by means of key 11h is disabled, this results in an error. If YES, in step E2, a check is made, in step E3, whether the operated key is X key 11j. In this case, since the operated key is X key 11j, the flow advances to step E4, and the larger of the two numeric data, input after X key 11j, is stored in register 17i and the remaining data is stored in register 17h, as the X-coordinate range data. Thus, in this case, numeric data "60" is stored in register 17i, and numeric data "−30" is stored in register 17h. Note that when NO is obtained in step E3, since the operated key is Y key 11k, the flow advances to step E5. In step E5, the larger of the two numeric data input after Y key 11k is stored in register 17k and the remaining data is stored in register 17j, as the Y-coordinate range data.

After the range data is set, formula data "y=sin x" is read out from register 17a to arithmetic operation section 15, in step E6. In step E7, display data for forming a new graph within the new range data, is calculated by arithmetic operation section 15 in accordance with the readout formula data. In this case, the X-coordinate range data "−30" and "60" and the Y-coordinate range data "−1" and "1" are respectively stored in registers 17h, 17i, 17j, and 17k, and the calculated results for these range data are sequentially input to buffer 14. After this data is input to buffer 14, a graph enlarged along the X-axis, as shown in FIG. 8E, is displayed in display section 19, in step E8, thus completing processing corresponding to the operation of enlargement/reduction B key 11h.

Figure 8F:
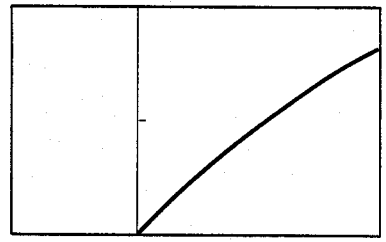

In order to enlarge or reduce a graph along the Y-axis, Y key 11k is operated to designate input of the Y-coordinate range data, as shown in FIG. 8F. Data "0", ",", and "1" are then input using numeric keys 11a and function keys 11b. When enlargement/reduction B key 11h is then operated, processing, shown in FIG. 11, is again executed. After it is determined, in step E1, that key 11h is operated, it is then determined, in step E2, that the first operated key is X key 11j or Y key 11k. Next, it is determined, in step, E3 that the operated key is not X key 11j, and the flow advances to step E5. In step E5, the larger data "1", of the two numeric data "0" and "1", input after Y key 11k, is stored in register 17k, and the remaining data "0" is stored in register 17j as Y-coordinate range data.

After the new range data is set, the formula data "y=sin x" is read out from register 17a to arithmetic operation section 15, in step E6, and display data for forming a new graph within the updated range data is calculated by section 15, in step E7. In this case, registers 17h and 17i store X-coordinate range data "−30" and "60", respectively, and registers 17j and 17k store Y-coordinate range data "0" and "1", respectively. The calculated results for the new range data are sequentially input to buffer 14. After this data is input to buffer 14, a graph enlarged along the Y axis, as shown in FIG. 8F, is displayed in section 19, in accordance with the display data stored in buffer 14, and processing corresponding to the operation of key 11h, is ended.

In the above descriptions, only graph enlargement display operations have been exemplified. Next, a graph reduction display operation will be described. FIGS. 12A through 12D show key operations and display states of display section 19 corresponding thereto. As shown in FIG. 12A, the same graph as in FIG. 8A is displayed in section 19. In other words, formula buffer 18 stores formula data "y=sin x", registers 17h and 17i store X-coordinate range data "−180" and "180", and registers 17j and 17k store Y-coordinate range data "−1" and "1".

When EXE key 11f is operated after Plot key 11d, to designate inputting of coordinate data (−360,2) and "−360", ",", and "2" are input using numeric keys 11a and function keys 11b, as shown in FIG. 12B, processing shown in FIG. 9 begins in accordance with the operation of EXE key 11f. Referring to FIG. 9, it is determined, in step C1, that key input corresponds to the Plot command, and in step C2, coordinate data stored in registers 17b and 17c are respectively transferred to registers 17n and 17o. In this case, since no coordinate data is input to registers 17b and 17c, no coordinate data is transferred to registers 17n and 17o. Next, in step C3, a turn-on signal is supplied to an address corresponding to coordinates (P'x,P'y) of graph display buffer 14. In this case, since no coordinate data is input to registers 17n and 17o, as described above, no turn-on signal is supplied to buffer 14. Thereafter, when it is determined, in step C4, that data is input after Plot key 11d, the flow advances to step C5 to check if data "−360", input after Plot key 11d, is ",". Since NO is obtained in step C5, the coordinate data "−360", input after Plot key 11d, is stored in register 17b. A check is made, in step C7, whether key input after ",", subsequent to the coordinate data "−360", corresponds to EXE key 11f. Since NO is obtained in step C7, the coordinate data "2", input after ",", is stored in register 17c, in step C8. In this way, input of the coordinate data, in accordance with the operation of Plot key 11d, is completed. In step C9, the coordinate data (−360,2) set in registers 17b and 17c are respectively input to registers 17l and 17m, for text display of a pointer. In step C10, control section 12 selects an address in buffer 14, corresponding to the coordinate data input to registers 17b and 17c, and supplies flickering data to the selected address. In this case, however, since the graph is to be reduced, no address corresponding to the coordinate data (−360,2) is allocated in buffer 14, and such an address cannot be selected. Therefore, no flickering data is supplied to buffer 14. In step C11, a graph is displayed in display section 19, to correspond with the contents of buffers 14 and 13. In this case, the content of register 17l is supplied to buffer 13, to display the coordinate of the pointer, and "X=−360" is displayed on the lower portion of the screen, in addition to the graph shown in FIG. 12A.

As shown in FIG. 12C, in order to input coordinate data (360,−2) orthogonal to the coordinate data (−360,2), Plot key 11d is operated. When EXE key 11f is operated, after "360", "," and "2" are input, using keys 11a and 11b, processing, shown in FIG. 9, again starts in response to the operation of key 11f. After it is determined, in step C1, that key input corresponds to the Plot command, the coordinate data "−360" and "2", stored in registers 17b and 17c, are respectively transferred to registers 17n and 17o, in step C2. Thereafter, a turn-on signal is supplied to an address corresponding to the coordinates (−360,2) of buffer 14. However, in this case, since such an address is not allocated in buffer 14, no turn-on signal is stored. Subsequently, it is determined in step C4 that data is input after Plot key 11d, and the flow advances to step C5. When it is determined, in step C5, that data immediately after Plot key 11d is not ",", data "360", immediately after the operation of key 11d, updates the content of register 17b. When it is determined, in step C7, that data after "," does not correspond to EXE key 11f, the flow advances to step C8, to input data "−2" to register 17c. In step C9, the contents of registers 17b and 17c are transferred to registers 17l and 17m, respectively. In step C10, although control section 12 selects an address in buffer 14, corresponding to the coordinate data (360,−2) in registers 17b and 17c, since such an address is not allocated in buffer 14, no selection is performed, and no flickering data is supplied. In step C11, a graph is displayed on display section 19, in accordance with the contents of buffers 14 and 13. In this case, the content of register 17l, as the coordinate of the pointer (although not displayed), is supplied to buffer 13, and the characters "X=360" are displayed on the lower portion of the screen, in addition to the graph shown in FIG. 12A.

Thereafter, when enlargement/reduction A key 11g is operated as shown in FIG. 12D, graph enlargement/reduction processing shown in FIG. 10 is executed. A check is made, in step D1, whether the X-coordinate data stored in register 17b is larger than that in register 17n. In this case, since the content of register 17b is "360" and that of register 17n is "−360", YES is obtained in step D1, and the flow advances to step D2. In step D2, the X-coordinate data stored in register 17b is transferred to register 17i, and that in register 17n is transferred to register 17h, as the new X-coordinate range data, and the flow then advances to step D3. In order to set the Y-coordinate range data as well as the X-coordinate range data, a check is made, in step D3, whether the Y-coordinate data stored in register 17c is larger than that in register 17o. In this case, since the content of register 17c is "−2" and that of register 17o is "2", NO is obtained in step D3, and the flow advances to step D7. In step D7, the data "2" in register 17o is input to register 17k, and the data "−2" in register 17c is input to register 17j, as the new Y-coordinate range data. After the new range data is set, the formula data "y=sin x" is read out from register 17a to arithmetic operation section 15, in step D6. In step D8, new display data for forming a new graph with the new range data is calculated by section 15, in accordance with the read-out formula data. Since registers 17h and 17i store X-coordinate range data "−360" and "360", respectively, and registers 17j and 17k store the Y-coordinate range data "−2" and "2", respectively, the calculated results for these range data are sequentially input to buffer 14. After the necessary data is input to buffer 14, a reduced graph (FIG. 12D) is displayed in display section 19, based on the display data input to buffer 14, in step D9, thus completing processing in accordance with the operation of key 11g.

Figure 13F:
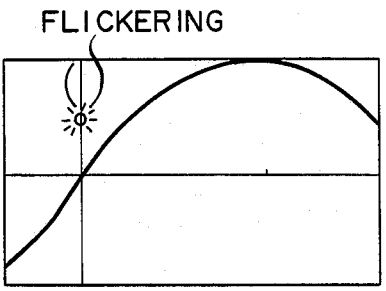

A graph enlargement display operation using enlargement key 11i will now be described with reference to FIGS. 13A through 13H, and FIGS. 14A and 14B. FIGS. 13A through 13H show key operations including enlargement key 11i and display states of display section 19 corresponding thereto. As shown in FIG. 13A, the graph and the coordinate axes are displayed in display section 19, in the same state as in FIG. 8A. Formula buffer 18 stores formula data "y=sin x", registers 17h and 17i store X-coordinate range data "−180" and "180", respectively, and registers 17j and 17k store Y-coordinate range data "−1" and "1", respectively.

Figure 14A:
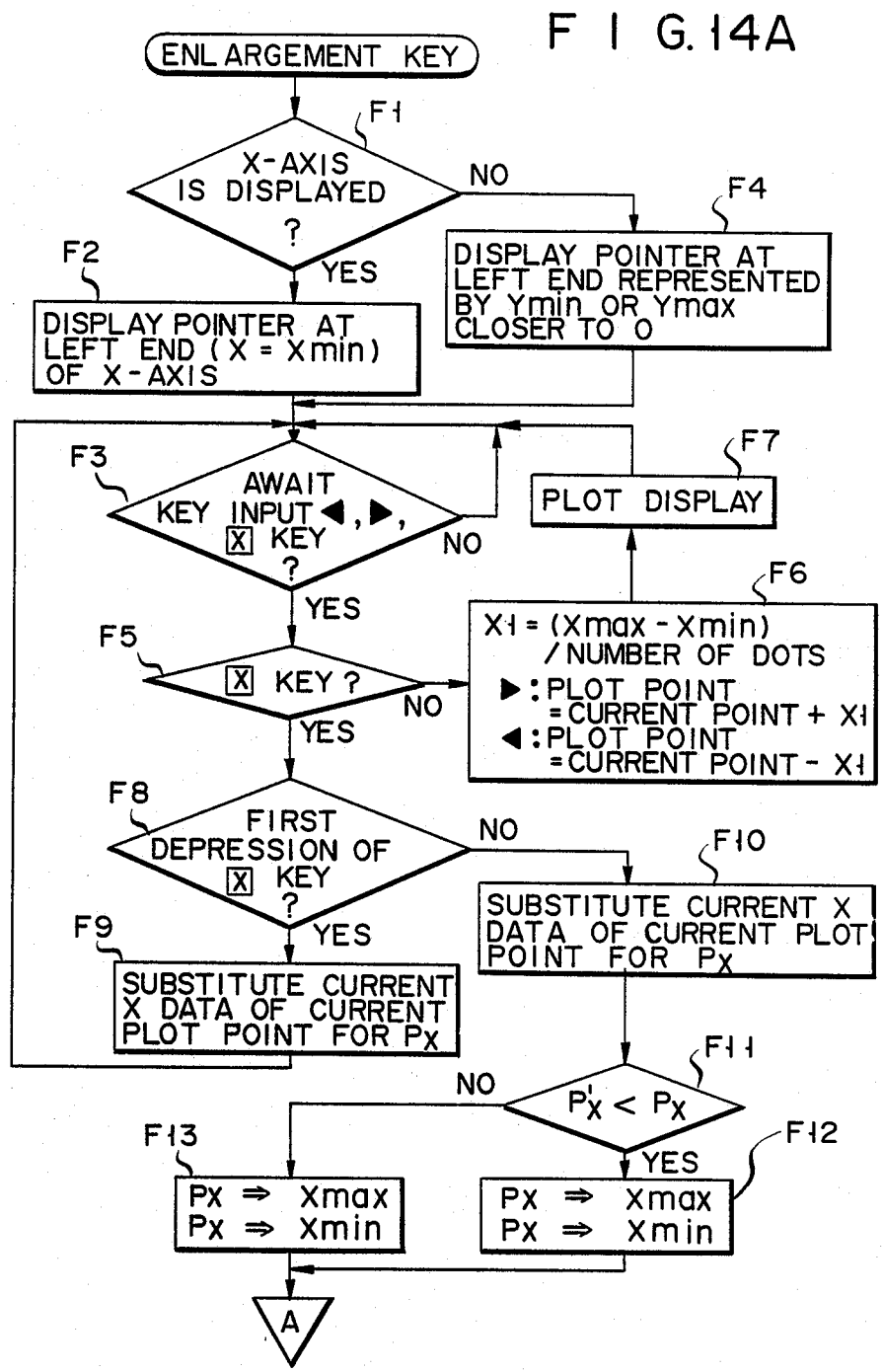
FIGS. 14A and 14B are flow charts of processing corresponding to the operation of an enlargement key.
Figure 14B:
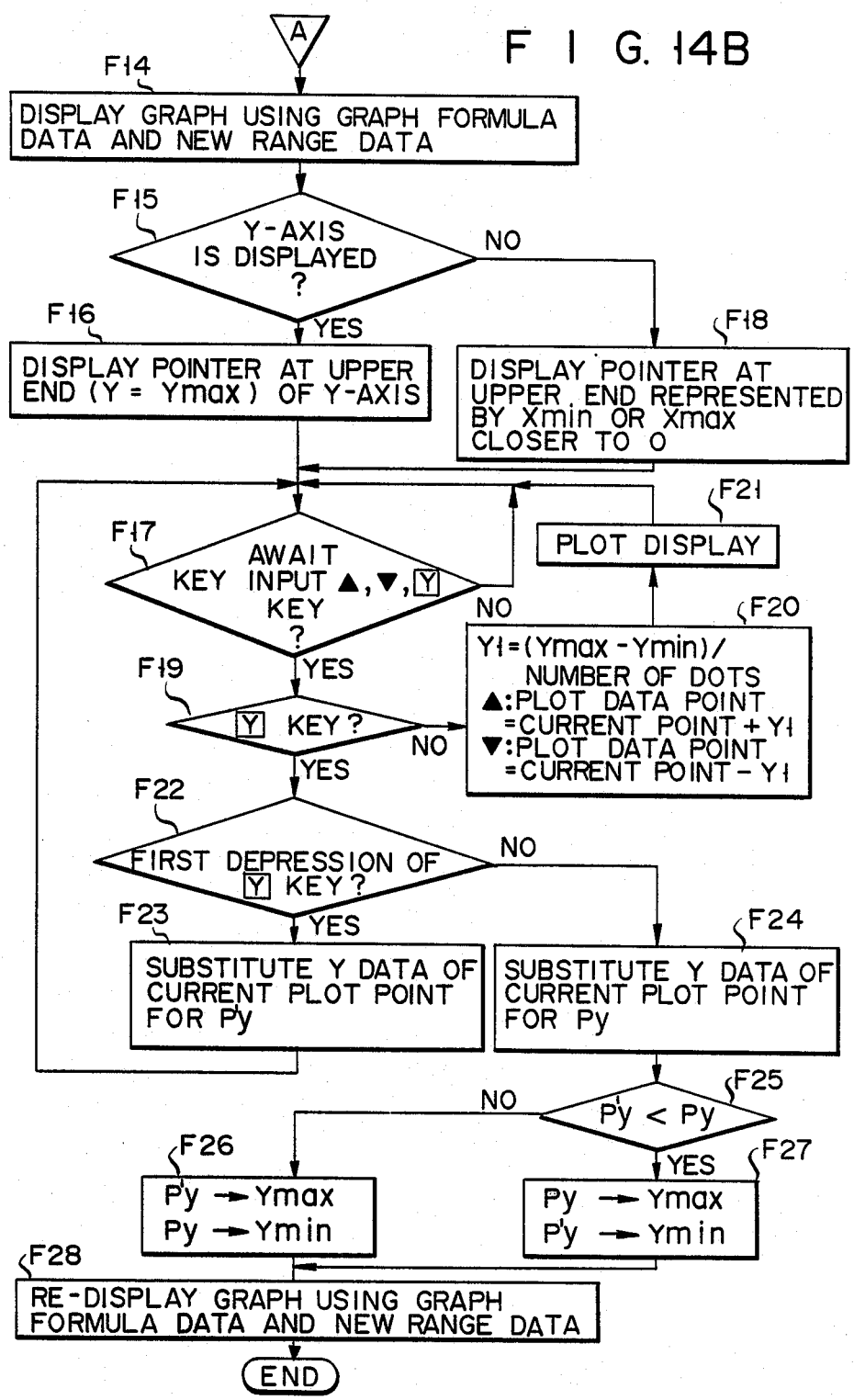

When enlargement key 11i is operated as shown in FIG. 13B, processing shown in FIGS. 14A and 14B starts in response thereto. Referring to FIG. 14A, a check is made, in step F1, whether the X-axis is displayed. In this case, since the X-axis is displayed, the flow advances to step F2, so that a display address in buffer 14, corresponding to the left end of the X-axis in display section 19, is selected, and flickering data is supplied thereto. The left end of the X-axis in display section 19 is represented in the form of coordinate data (Xmin,0) using data "Xmin" stored in register 17h. In this case, coordinates of the left end of the X-axis are (−180,0). When the flickering data is written at the address corresponding to the coordinate position, a pointer is displayed in section 19 accordingly, and control section 12 awaits key input corresponding to cursor keys for designating horizontal movement, or X key 11j, in step F3.

If it is determined, in step F1, that the X-axis is not displayed, the flow advances to step F4, and flickering data is written at an address in buffer 14 corresponding to the left end of section 19, represented by, e.g., coordinate data (Xmin,Ymin) using the one of the contents of registers 17*j* and 17*k* closer to 0 (in this case, "Ymin"). Thus, a pointer is displayed in section 19, in accordance with the flickering data, and the flow advances to step F3.

In the key-input standby state of step F3, when a cursor key of function keys 11*b*, for designating right movement, is operated, as shown in FIG. 13C, the flow advances to step F5, to check if the key input corresponds to X key 11*j*. In this case, since the cursor key for designating right movement is operated, NO is obtained in step F5, and the flow advances to step F6. In step F6, a Plot point of the pointer is calculated in accordance with the moving direction of the operated cursor key. In the arithmetic operation of the Plot point of the pointer, the X-coordinate can be obtained from the following formulas (the Y-coordinate is "0") with reference to dot unit "X1" given by:

$$X1 = (X\text{max} - X\text{min})/(\text{the number of dots}) \quad (7)$$

(in this case, the number of dots is, e.g., 95)

If the moving direction of the cursor key is right:

Plot point = current point + $X1$

If the moving direction of the cursor key is left:

Plot point = current point − $X1$

In step F7, Plot display is performed in accordance with the Plot point obtained from the above arithmetic operation, and the flow returns to step F3.

The cursor key for designating right movement is operated several times to repeat the operation of step F3 and steps F5 through F7, thereby displaying the pointer at a required position. At this time, upon first operation of X key 11*j* for setting range data, YES is obtained in step F5, and the flow advances to step F8. A check is made, in step F8, whether X key 11*j* is operated for the first time. In this case, since X key 11*j* is operated for the first time, the flow advances to step F9, and X-coordinate data of the current plot point of the pointer is input to register 17*n*, thus awaiting the next key input in step F3.

Next, as shown in FIG. 13D, the cursor key for designating right movement is again operated several times to repeat the operation of step F3 and steps F5 through F7, thereby moving the pointer to the right. Alternatively, a cursor key for moving the pointer to the left can be operated.

When the pointer is displayed at the required position, X key 11*j* is operated for a second time to set the range data, as shown in FIG. 13E. Upon this operation, since YES is obtained in step F5, the flow advances to step F8. If NO is obtained in step F8, the flow advances to step F10, and X-coordinate data of the current plot point of the pointer is input to register 17*b*. A check is made, in step F11, whether the content of register 17*n*, set in step F9, is smaller that that of register 17*b*, set in step F10. In this case, since the content of register 17*n* is smaller that that of register 17*b*, the contents of registers 17*b* and 17*n* are respectively input to registers 17*i* and 17*h*, as the X-coordinate range data. However, if it is determined, in step F11, that the content of register 17*n* is not smaller than that of register 17*b*, the second plot point is located at the negative side (i.e., left side) of the first plot point, and the flow advances to step F13. In step F13, the contents of registers 17*n* and 17*b* are respectively input to registers 17*i* and 17*h* as the X-coordinate range data, in a manner opposite to step F12. After the new X-coordinate range data is set in step F14, new display data is calculated by arithmetic operation section 15, based on the formula data stored in register 17*a*, and new X- and Y-coordinate range data stored in registers 17*h*, 17*i*, 17*j*, and 17*k*, respectively. The calculated results are supplied to buffer 14, and the enlarged graph is displayed in section 19. In addition to this, a check is made, in step F15, whether the Y axis is displayed on the graph of section 19. In this case, since the Y axis is displayed, the flow advances to step F16, and flickering data is written at an address in buffer 14, corresponding to the upper end of the displayed Y axis (i.e., coordinates (0,Ymax)). The pointer is displayed in display section 19 in accordance with the flickering data, and the next key input, using cursor keys for designating vertical movement, or Y key 11*e*, is awaited in step F17.

If it is determined, in step F15, that the Y-axis is not displayed, the flow advances to step F18. In step F18, the flickering data is written at the address in buffer 14, corresponding to the upper end of section 19, represented by, e.g., coordinate data (Xmin,Ymax) using one of contents of registers 17*h* and 17*i* closer to 0 (in this case, "Xmin"). Thus, the pointer is displayed in section 19, in accordance with the flickering data, and the flow advances to step F17.

In the key-input standby state of step F17, when a cursor key of function keys 11*b*, for designating downward movement, is operated, as shown in FIG. 13F, the flow then advances to step F19, to check if this key input corresponds to Y key 11*k*. In this case, since the cursor key is operated, NO is obtained in step F19, and the flow advances to step F20. In step F20, a Plot point of the pointer is calculated in accordance with the moving direction of the operated cursor key. In the arithmetic operation of the Plot point of the pointer, the Y-coordinate can be obtained from the following formulas (the X-coordinate is "0") with reference to dot unit "Y1" given by:

$$Y1 = (Y\text{max} - Y\text{min})/(\text{the number of dots}) \quad (8)$$

(in this case, the number of dots is, e.g., 63)

If the moving direction of the cursor key is upward:

Plot point = current point + $Y1$

If the moving direction of the cursor key is downward:

Plot point = current point − $Y1$

In step F21, Plot display is executed in accordance with the Plot point obtained from the above arithmetic operation, and the next key input is again awaited in step F17.

In this way, the cursor key for designating downward movement is operated several times to repeat the operation of step F17 and steps F19 through F21, so that the pointer is displayed at the required position. At that time, upon a first operation of Y key 11*k*, for setting the range data, it is determined in step F19 that Y key 11*k* is operated, and the flow advances to step F22. A check is made, in step F22, whether Y key 11*k* is operated for the first time. In this case, since YES is obtained in step F22, the flow advances to step F23, and Y-coordinate data of the current Plot point of the pointer is input to register 17o, and next key input is awaited again in step F17.

Figure 13G:
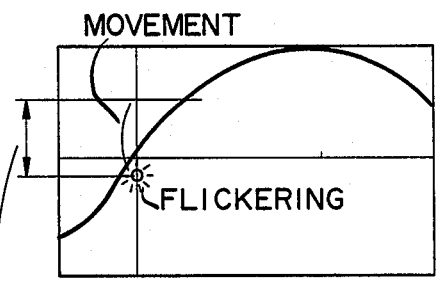
Figure 13H:
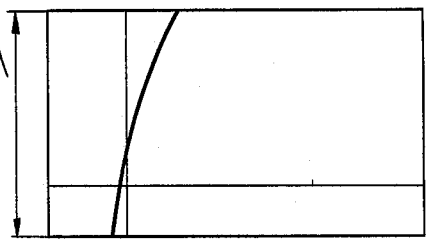

Next, as shown in FIG. 13G, the cursor key for designating downward movement is operated several times to repeat the operation of step F17 and steps F19 through F21, so that the pointer is moved downward. Alternatively, a cursor key for designating upward movement can be operated.

When the pointer is displayed at the required position, if Y key 11k is operated for a second time to set the range data, it is determined, in step F19, that Y key 11k is operated, and the flow advances to step F22. In this case, since NO is obtained in step F22, the flow advances to step F24, and Y-coordinate data of the current Plot point of the pointer is input to register 17c. A check is made, in step F25, whether the content of register 17o, set in step F23, is smaller than that of register 17c, set in step F24. In this case, since the content of register 17o is not smaller than that of register 17c, the contents of registers 17o and 17c are respectively input to registers 17k and 17j as the Y-coordinate range data, in step F26. However, if YES, in step F25, since the second Plot point is located at the positive side (i.e., the upper side) of the first Plot point, the flow advances to step F27, and the contents of registers 17c and 17o are respectively input to registers 17k and 17j as the Y-coordinate range data, in a manner opposite to step F26. After the new Y-coordinate range data is set, new display data is calculated by arithmetic operation section 15, based on the formula data stored in register 17a, the new Y-coordinate range data stored in registers 17j and 17k, and the X-coordinate data in 17h and 17i, in step F28. The calculated results are supplied to buffer 14, and the enlarged graph is displayed in section 19. In this way, the graph enlargement display operation, in which the range data is designated on the displayed axes, upon operation of enlargement key 11i, is completed. When enlargement key 11i is used, since the range data is designated on the displayed axes, a non-displayed range cannot be designated. Therefore, graph reduction display cannot be performed with this key.

Figure 15:
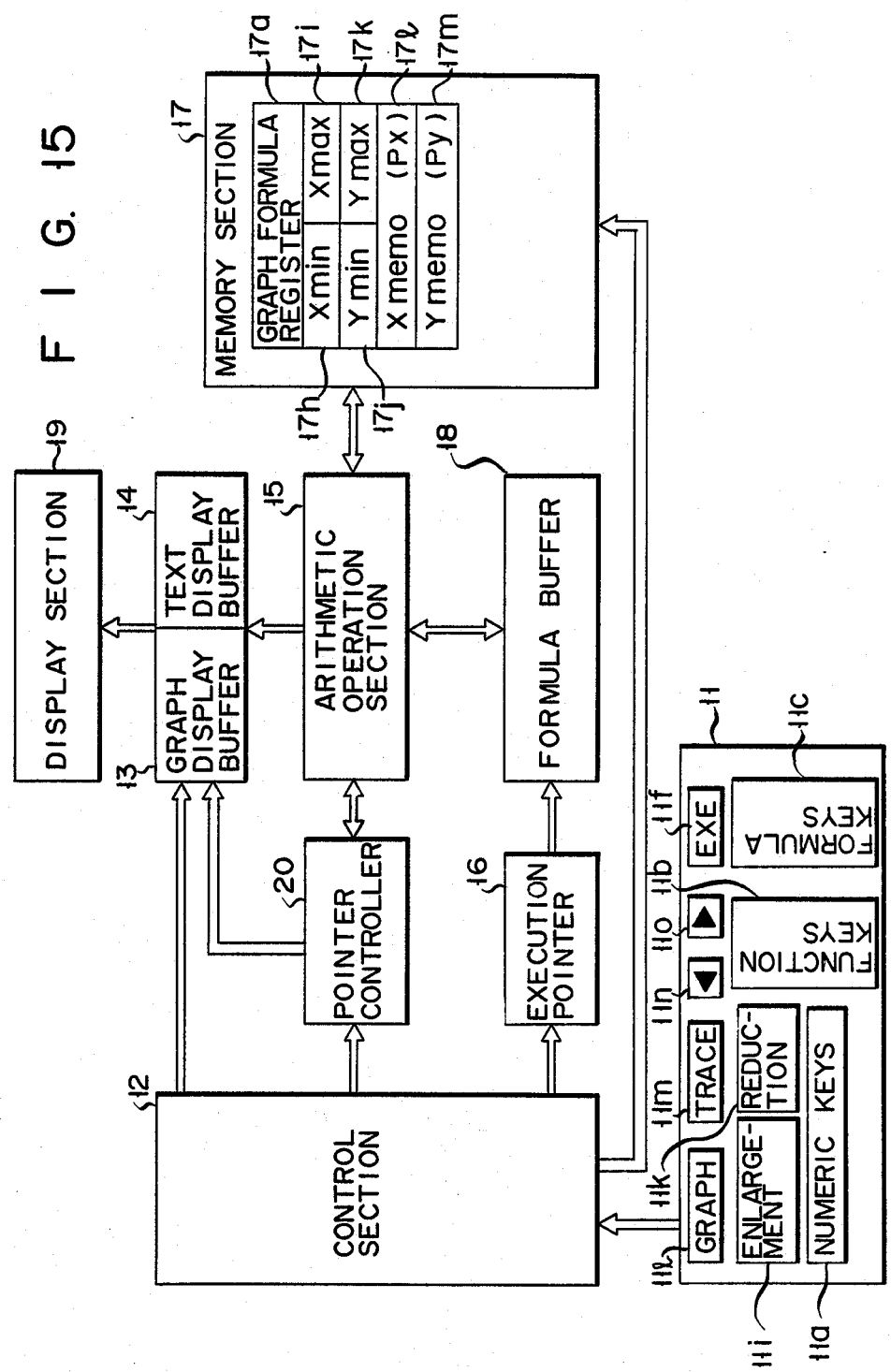
FIG. 15 is a block diagram of an electronic calculator according to a third embodiment of the present invention.

FIG. 15 is a block diagram of an electronic calculator according to a third embodiment of the present invention. The same reference numerals in FIG. 15 denote the same parts as in FIGS. 1 and 7. In this embodiment, key input section 11 is additionally provided with Graph key 11l for designating function input for graph display, Trace key 11m for designating tracing on a graph line using a pointer, "←" key 11n for designating left movement of the pointer (in the drawings, indicated by "▲"), "→" key 11o for designating the right movement of the pointer (in the drawings, indicated by "◀"), and reduction key 11p for designating reduction of a displayed graph.

Pointer controller 20 is provided between control section 12 and arithmetic operation section 15, and is connected to graph display buffer 13, so as to control pointer display.

The operation of the third embodiment will be described below.

FIGS. 16A through 16D show key operations and display states of display section 19 corresponding thereto. As shown in FIG. 16A, Graph key 11l is operated, and "Sin" and "X" keys of function keys 11c are subsequently operated. Upon these key operations, formula data $$Y = \sin X$$

is stored in graph formula register 17a of memory section 17 and in formula buffer 18, through arithmetic operation section 15. In addition to this, the formula data stored in memory section 17 is stored in text display buffer 14, through arithmetic operation section 15, as display data. Thus, the display shown in FIG. 16A, i.e., Graph: $Y = \sin X$ is displayed in display section 19. Although not shown, "−180", "180", "−1", and "1" are respectively stored in Xmin register 17h, Xmax register 17i, Ymin register 17j, and Ymax register 17k, as range data.

When EXE key 11f is operated to execute graph display, as shown in FIG. 16B, control section 12 detects this key operation and supplies a control command to graph display buffer 13 and memory section 17. Thereby, data stored in registers 17h, 17i, 17j, and 17k are read out to arithmetic operation section 15. Section 15 calculates graph display data, based on dot-number data of a dot matrix constituting display section 19, and supplies the calculated data to graph display buffer 13. Then, a graph representing formula $$Y = \sin X$$

is displayed in accordance with the graph display data stored in buffer 13, as shown in FIG. 16B.

When Trace key 11m is operated, as shown in FIG. 16C, control section 12 detects this key operation, and supplies a control command to pointer controller 20, execution pointer 16, and memory section 17. In response to the control command, the content "−180" of register 17h, of memory section 17, is read out therefrom, and updates the content of Xmemo register 17l. In addition, the data "−180" is substituted in X of formula "$Y = \sin X$" by arithmetic operation section 15, and resultant data "0" for "Y" is stored in Ymemo register 17m. The data stored in registers 17l and 17m (i.e., coordinate data "−180" and "0" of a pointer) is supplied to arithmetic operation section 15, to be calculated thereby, and the calculated data is then supplied to graph display buffer 13, as the display data. Buffer 13 causes the display data supplied from section 15 to be displayed on display section 19, as the pointer, in accordance with control data supplied from pointer controller 20. More specifically, as shown in FIG. 16C, the leftmost point on the graph curve in section 19 is flickered as the pointer. At the same time, the X-coordinate data "−180" stored in register 17l is stored in text display buffer 14, through section 15, and is then supplied to section 19, thus performing text display "X= −180" on the lower portion of the screen.

Next, "→" key 11o is sequentially operated several times, as shown in FIG. 16D. Upon each operation of key 11o, the X-coordinate data of the pointer stored in register 17l is updated, and the arithmetic operation is conducted, based on the updated data and the formula data stored in formula buffer 18. The calculated result is stored in register 17m as the Y-coordinate data. The data stored in registers 17l and 17m are fetched into section 15 to be calculated thereby, and is then supplied to buffer 13 as display data. In addition, the data stored in register 17l is stored in buffer 14, through section 15, to perform text display on the lower portion of the screen. In this way, the pointer in display section 19 is displayed to trace the graph curve dot by dot in the positive direction of the X coordinate, and the X-coordinate data of the pointer at that time (e.g., "X=60") is text-displayed on the lower portion of the screen. Note that the Y-coordinate data stored in register 17m at that time is "0.866" (= sin 60).

Figure 16E:
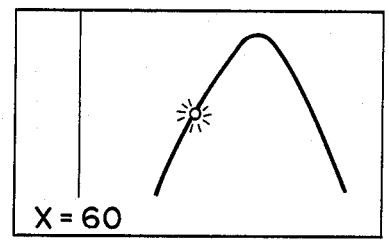

If enlargement key 11i is then operated, as shown in FIG. 16E, processing shown in FIG. 17 is executed in response thereto.

FIG. 17 shows graph enlargement display processing, using specific magnification n. For the graph shown in FIGS. 16A through 16H, specific magnification n is set at "2". Referring to FIG. 17, a check is made, in step G1, if data is stored in registers 17l and 17m, i.e., if the pointer is displayed in section 19. In this case, "60" and "0.866" are respectively stored in registers 17l and 17m, YES is obtained in step G1, and the flow advances to step G2. In step G2, range data "=180", "180", "−1", and "1", stored in registers 17h, 17i, 17j, and 17k, and coordinate data "60" and "0.866" of the pointer stored in registers 17l and 17m, are read out to arithmetic operation section 15. In step G3, the following arithmetic operations are performed using X-coordinate range data "−180" and "180" in registers 17h and 17i, and X-coordinate data "60" of the pointer in register 17l:

$$Px + (Xmax - Xmin)/2n = 60 + [180 - (-180)]/(2 \times 2) \quad (9)$$

$$Px - (Xmax - Xmin)/2n = 60 - [180 - (-180)]/(2 \times 2) \quad (10)$$

The resultant data "150" and "−30" is input to registers 17i and 17h, respectively. In step G4, the following arithmetic operations are performed using Y-coordinate range data "−1" and "1" in registers 17j and 17k and Y-coordinate data "0.866" of the pointer in register 17m:

$$Py + (Ymax - Ymin)/2n = 0.866 + (1 - (-1))/(2 \times 2) \quad (11)$$

$$Py - (Ymax - Ymin)/2n = 0.866 - (1 - (-1))/(2 \times 2) \quad (12)$$

The resultant data "1.37" and "0.37" are respectively input to registers 17j and 17k. After the new range data is set, the flow advances to step G5, and graph formula data (in this case, "Y= sin X") is read out from register 17a to arithmetic operation section 15. In step G6, graph display data is calculated by section 15, based on range data "−30", "150", "0.37", and "1.37" stored in registers 17h, 17i, 17j, and 17k, updated in steps G3 and G4, and the dot-number data constituting the dot matrix of section 19. The calculated result is written in buffer 13. In step G7, the display data stored in buffer 13 is supplied to section 19 under the control of the control command from control section 12 and pointer controller 20. Thus, a graph which is enlarged twice that of FIG. 16D, with the pointer as the center, is displayed on section 19, as shown in FIG. 16E. In this case, since the X-coordinate data "60" of the pointer stored in register 17l is supplied to buffer 14, through section 15, "X=60" is text-displayed on the lower portion of section 19.

Figure 18:
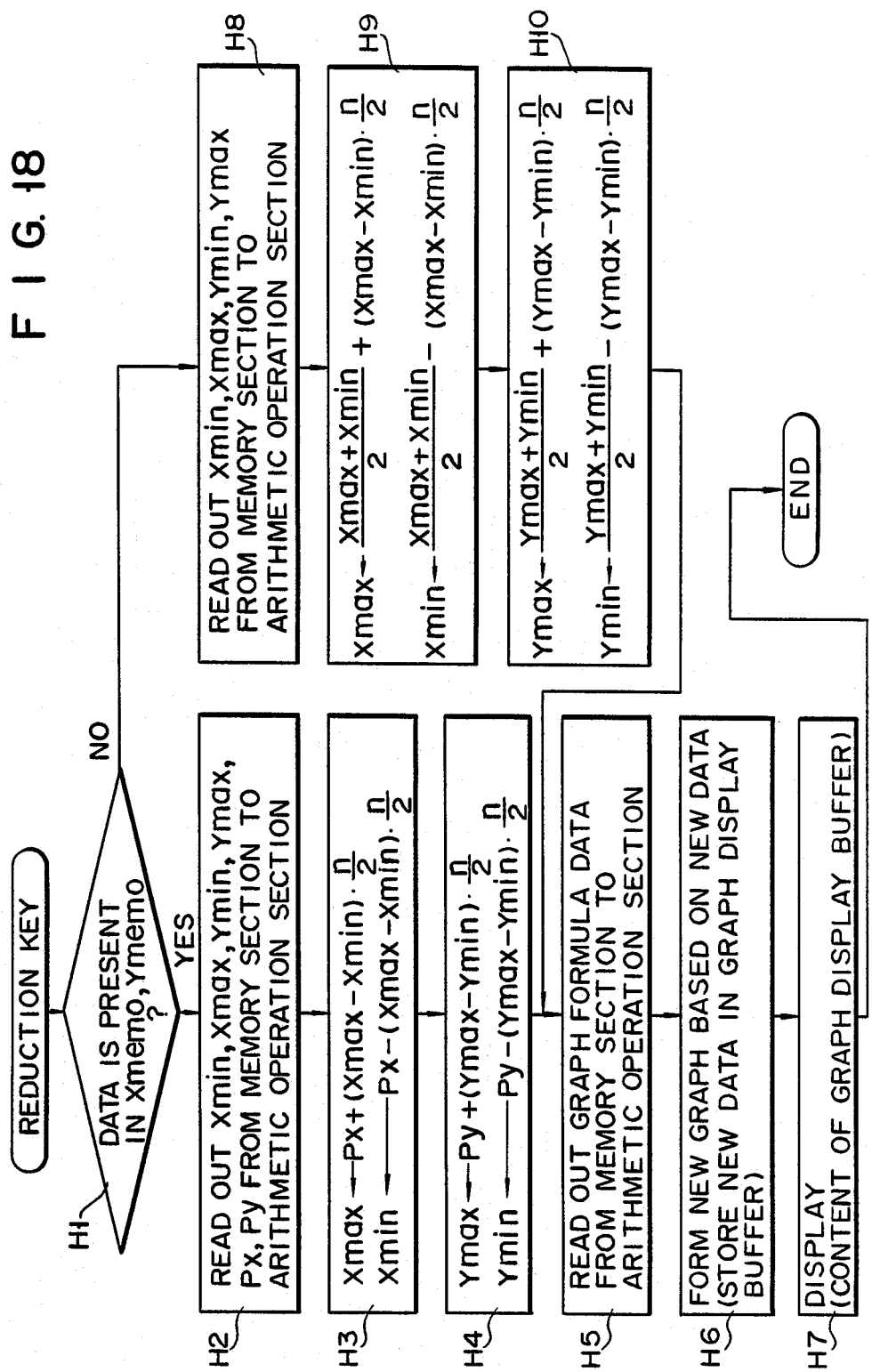
FIG. 18 is a flow chart showing processing content corresponding to the operation of a reduction key.

When reduction key 11p is operated instead of key 11i, in the state shown in FIG. 16D, processing shown in FIG. 18 is executed in response thereto.

FIG. 18 shows graph reduction display processing using specific magnification 1/n, and for the graph shown in FIGS. 16A through 16H, specific magnification 1/n is set at, e.g., "½". Firstly, a check is made, in step H1, whether data is stored in registers 17 and 17m, i.e., if the pointer is displayed in section 19. In this case, since registers 17l and 17m respectively store data "60" and "0.866", YES is obtained in step H1, and the flow advances to step H2. In step H2, the range data "−180", "180", "−1", and "1" stored in registers 17h, 17i, 17j, and 17k, and coordinate data "60" and "0.866" stored in registers 17l and 17m, are supplied to arithmetic operation section 15. In step H3, the following arithmetic operations are performed using X-coordinate range data "−180" and "180", in registers 17h and 17i and X-coordinate data "60" of the pointer in register 17l:

$$Px + (Xmax - Xmin)n/2 = 60 + [180 - (-180)] \times 2/2 \quad (13)$$

$$Px - (Xmax - Xmin)n/2 = 60 - [180 - (-180)] \times 2/2 \quad (14)$$

The resultant data "420" and "−300" are respectively input to registers 17i and 17h as the new X-coordinate range data. In step H4, the following arithmetic operations are performed using Y-coordinate range data "−1" and "1", in registers 17j and 17k, and Y-coordinate data "0.866" of the pointer in register 17m:

$$Py + (Ymax - Ymin)n/2 = 0.866 + [1 - (-1)] \times 2/2 \quad (15)$$

$$Py - (Ymax - Ymin)n/2 = 0.866 - (1 - (-1)) \times 2/2 \quad (16)$$

Figure 16F:
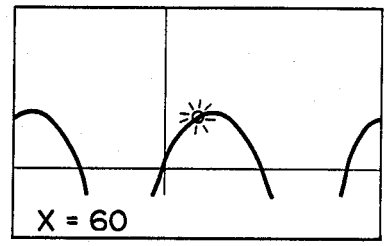

The resultant data "2.87" and "−1.13" are respectively input to registers 17j and 17i as the new Y-coordinate range data. After the new range data is set, the flow advances to step H5, and graph formula data (in this case, formula "Y= sin X") is read out from register 17a to arithmetic operation section 15. In step H6, graph display data is calculated by section 15, using the range data "−300", "420", "−1.13", and "2.87" stored in registers 17h, 17i, 17j, and 17k, updated in steps H3 and H4, and the dot-number data constituting the dot matrix of section 19. The calculated result is written in buffer 13. In step H7, the display data stored in buffer 13 is supplied to section 19 in response to the control command from control section 12 and pointer controller 20, and a graph, which is reduced to ½ that in FIG. 16D, with the pointer as its center, is displayed in section 19, as shown in FIG. 16F. In this case, since the X-coordinate data "60" of the pointer stored in register 17l is supplied to buffer 14, "X=60" is text-displayed on the lower portion of section 19.

In the above descriptions, a case has been exemplified in which enlargement key 11i or reduction key 11p is operated to enlarge or reduce a graph using the coordinates of the pointer as the center when the pointer is displayed on the screen of section 19. However, when no pointer is displayed on the screen of section 19, if key 11i or 11p is operated, the displayed graph is enlarged or reduced about the central coordinates of the displayed screen at that time. This operation will be described below.

Figure 16G:
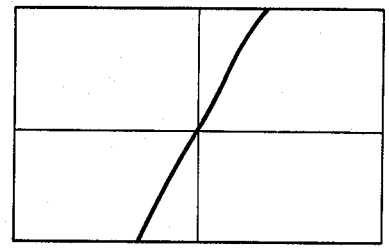

More specifically, when enlargement key 11i is operated as shown in FIG. 16G, in the state where the pointer is not displayed, as shown in FIG. 16B, processing shown in FIG. 17 is executed in response thereto.

Referring to FIG. 17, a check is made, in step G1, whether data is stored in registers 17l and 17m. In this case, since no data is stored in registers 17l and 17m, NO is obtained in step G1, and the flow advances to step G8. In step G8, the range data "−180", "180", "−1", and "1" stored in registers 17h, 17i, 17j, and 17k, are read out to arithmetic operation section 15. In step G9, the following arithmetic operations are performed using the X-coordinate range data "−180", and "180" stored in registers 17h and 17i:

$$(X\text{max} + X\text{min})/2 + (X\text{max} - X\text{min})/2n = \quad (17)$$

$$[180 + (-180)]/2 + [180 - (-180)]/(2 \times 2)$$

$$(X\text{max} + X\text{min})/2 - (X\text{max} - X\text{min})/2n = \quad (18)$$

$$[180 + (-180)]/2 - [180 - (-180)]/(2 \times 2)$$

The resultant data "90" and "−90" is respectively input to registers 17i and 17h, as the new X-coordinate range data. Similarly, in step G10, the following arithmetic operations are performed using the Y-coordinate range data "−1" and "1" stored in registers 17j and 17k:

$$(Y\text{max} + Y\text{min})/2 + (Y\text{max} - Y\text{min})/2n = \quad (19)$$

$$[1 + (-1)]/2 + [1 - (-1)]/(2 \times 2)$$

$$(Y\text{max} + Y\text{min})/2 - (Y\text{max} - Y\text{min})/2n = \quad (20)$$

$$[1 + (-1)]/2 - [1 - (-1)]/(2 \times 2)$$

The resultant values "0.5" and "−0.5" are respectively stored in registers 17k and 17j, as the new Y-coordinate range data. Note that the first term in formulas (17) and (18):

$$[180+(-180)]/2$$

and the first term in formulas (19) and (20):

$$[1+(-1)]/2$$

allow calculation of the coordinate data of the central point, from the range data. After the new range data is set, the flow advances to step G5, and formula data "Y = sin X" is read out from register 17a, of memory section 17, to arithmetic operation section 15. In step G6, graph display data is calculated based on the new range data "−90", "90", "−0.5", and "0.5" (stored in registers 17h, 17i, 17j, and 17k, after being updated in steps G9 and G10), and the dot-number data constituting the dot matrix of section 19. The calculated result is written in buffer 13. In step G7, the display data stored in buffer 13 is supplied to section 19 in response to the control command from control section 12, and a graph which is enlarged to twice that in FIG. 16B, using the central coordinates of the display screen as the central point, is displayed, as shown in FIG. 16G.

When reduction key 11p is operated instead of enlargement key 11i in the state where the pointer is not displayed, as shown in FIG. 16B, processing shown in FIG. 18 is executed in response thereto.

Referring to FIG. 18, a check is made, in step H1, whether data is stored in registers 17l and 17m. Since no data is stored in registers 17l and 17m, NO is obtained in step H1, and the flow advances to step H8. In step H8, the following arithmetic operations are performed using the X-coordinate range data "−180", and "180" stored in registers 17h and 17i:

$$(X\text{max} + X\text{min})/2 + (X\text{max} - X\text{min})n/2 = \quad (21)$$

$$[180 + (-180)]/2 + [180 - (-180)] \times 2/2$$

-continued $$(X\text{max} + X\text{min})/2 - (X\text{max} - X\text{min})n/2 = \quad (22)$$

$$[180 + (-180)]/2 - [180 - (-180)] \times 2/2$$

The resultant values "360" and "−360" are respectively stored in registers 17i and 17h, as the new X-coordinate range data. In step H10, the following arithmetic operations are performed using the Y-coordinate range data "−1" and "1" stored in registers 17j and 17k:

$$(Y\text{max} + Y\text{min})/2 + (Y\text{max} - Y\text{min})n/2 = \quad (23)$$

$$[1 + (-1)]/2 + [1 - (-1)] \times 2/2$$

$$(Y\text{max} + Y\text{min})/2 - (Y\text{max} - Y\text{min})n/2 = \quad (24)$$

$$[1 + (-1)]/2 - [1 - (-1)] \times 2/2$$

Figure 16H:
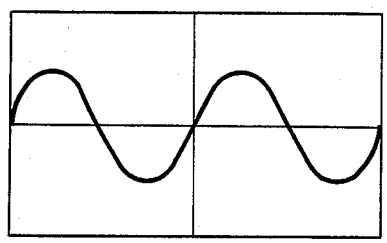

The resultant values "2" and "−2" are respectively stored in registers 17k and 17j, as the new Y-coordinate range data. After the new range data is set, the flow advances to step H5, and the formula data "Y = sin X" is read out from register 17a to arithmetic operation section 15. In step H6, graph display data is calculated using the new range data "−360", "360", "−2", and "2" (stored in registers 17h, 17i, 17j, and 17k, after being updated in steps H9 and H10), and the dot-number data constituting the dot matrix of section 19. The calculated result is written in buffer 13. In step H7, the display data stored in buffer 13 is supplied to section 19, in response to the control command from control section 12, and a graph which is reduced to ½ that shown in FIG. 16B, using the central coordinates of the display screen as the cental point, is displayed, as shown in FIG. 16H.

In this embodiment, specific values are used as enlargement or reduction magnification factors. However, for example, the operation period of enlargement key 11i or reduction key 11p can be counted, to alter the degree of magnification accordingly. Alternatively, the number of successive key operations of key 11i or 11p can be counted, to alter the degree of magnification accordingly.

An electronic calculator according to a fourth embodiment of the present invention will now be described with reference to FIGS. 19 through 23. Since the fourth embodiment can be realized using the circuit configuration shown in FIG. 15, a description thereof will be omitted.

FIG. 19A shows a state wherein a graph of "Y = sin X" is displayed upon key operations shown in FIGS. 16A and 16B, and " " key 11o is operated several times after Trace key 11m is operated, as shown in FIGS. 16C and 16D.

Coordinates of the pointer shown in FIG. 19A are (60,0.866), as previously described. FIG. 19B shows a detailed dot display drive state near the pointer. When enlargement key 11i is operated as shown in FIG. 19C, processing shown in FIG. 20 is executed in response thereto.

More specifically, FIG. 20 shows graph enlargement display processing for converting range data into coordinate data for corners of a rectangle or square, consisting of a plurality of dots, using a displayed pointer as the center. In this case, a square range including dots a and b, in FIG. 19B, as corners, is enlarged. In step I1, range data "−180", "180", "−1", and "1" respectively stored in Xmin register 17h, Xmax register 17i, Ymin register 17*j*, and Ymax register 17*k*, and coordinate data "60" and "0.87" of a pointer stored in Xmemo and Ymemo registers 17*l* and 17*m*, are read out to arithmetic operation section 15. In step I2, the following arithmetic operations are performed using the X-coordinate range data "−180" and "180" stored in registers 17*h* and 17*i*, X-coordinate data "60" of the pointer stored in register 17*l*, dot number dx "121" in the X direction of display section 19, and dot-span number m "1", from the dot of the displayed pointer to an adjacent dot in the X direction, to obtain a new display range:

$$Px + (X\max - X\min)m/(dx - 1) = \qquad (25)$$
$$60 + [180 - (-180)] \times 1/(121 - 1)$$

$$Px - (X\max - X\min)m/(dx - 1) = \qquad (26)$$
$$60 - [180 - (-180)] \times 1/(121 - 1)$$

The resultant values "33" and "27" are respectively stored in registers 17*i* and 17*h*, as the new X-coordinate range data. Similarly, in step I3, the following arithmetic operations are performed using the Y-coordinate range data "−1" and "1" stored in registers 17*j* and 17*k*, Y-coordinate data "0.87" of the pointer stored in register 17*m*, dot number dy "101" in the Y direction of display section 19, and dot-span number n"1", from the dot of the displayed pointer to an adjacent dot in the Y direction, to obtain a new display range:

$$Py + (Y\max - Y\min)n/(dy - 1) = \qquad (27)$$
$$0.87 + [1 - (-1)] \times 1/(101 - 1)$$

$$Py - (Y\max - Y\min)n/(dy - 1) = \qquad (28)$$
$$0.87 - [1 - (-1)] \times 1/(101 - 1)$$

The resultant values "0.46" and "0.42" are resepectively stored in registers 17*j* and 17*k*, as the new Y-coordinate data. After the new range data is set, the flow advances to step I4, and formula data (in this case, "Y = sin X") is read out from register 17*a* to arithmetic operation section 15. In step I5, graph display data is calculated using the readout graph formula data, the new range data "27", "33", "0.42", and "0.46" (stored in registers 17*h*, 17*i*, 17*j*, and 17*k*, after being updated in steps I2 and I3), and dot-number data "121" and "101", constituting the dot matrix of section 19, and the calculated result is written in graph display buffer 13. In step I6, the display data stored in buffer 13 is supplied to section 19, in response to a control command from control section 12 and pointer controller 20. Thus, a graph is displayed to be enlarged, using the pointer as the central point, so that dots a and b define the display range. In this case, since the X-coordinate data "60" stored in register 17*l* is supplied to text display buffer 14, through arithmetic operation section 15, text display "X=60" is performed on the lower portion of section 19. In this embodiment, since enlargement display is performed, using coordinate data of a dot adjacent to the displayed pointer, as the new range data, values of m and n in steps I2 and I3 of FIG. 20 are "1". However, the present invention is not limited to this. For example, when a range of 7×5 dots, having the pointer as the center, is enlarged as new range data, m is "2", and n is "3".

Graph enlargement display processing by enlargement key 11*i* has been exemplified. Next, graph reduction display processing by reduction key 11*p* will be described.

A case will be described wherein a displayed graph is reduced to the specific number of dots (e.g., 3×3 dots), having the pointer as the central point, without changing the position of the pointer.

Figure 21A:
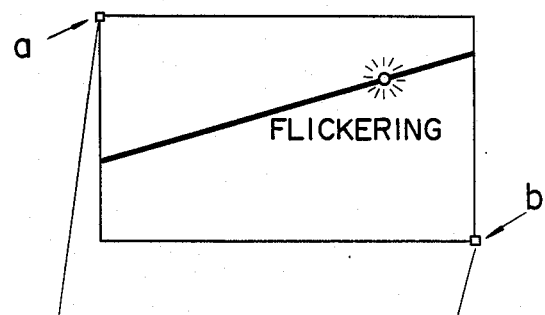
FIGS. 21A through 21C are illustrations showing key operations for reduction display and states of the display section corresponding thereto.

Assume that a graph shown in FIG. 21A is displayed in display section 19, and a pointer is flickered on a graph curve.

Figure 21B:
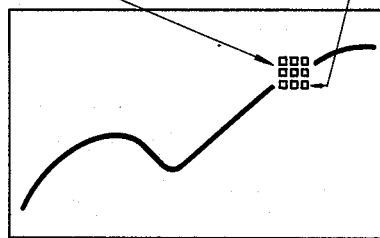
Figure 22:
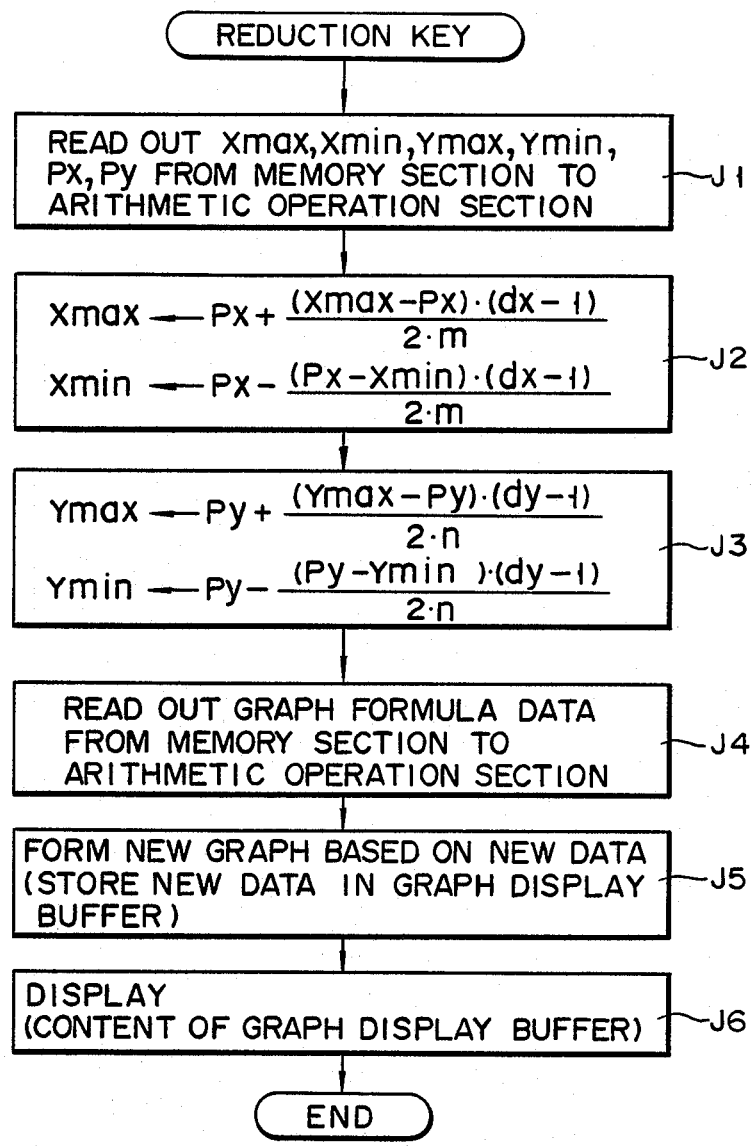
FIGS. 22 and 23 are flow charts showing processing content corresponding to the operation of a reduction key.

When reduction key 11*p* is operated as shown in FIG. 21B, processing of FIG. 22 is executed in response thereto.

Referring to FIG. 22, in step J1, range data stored in registers 17*h*, 17*i*, 17*j*, and 17*k*, and coordinate data Px and Py of the pointer stored in registers 17*l* and 17*m*, are read out to arithmetic operation section 15. In step J2, the following arithmetic operations are performed using the X-coordinate range data stored in registers 17*h* and 17*i*, X-coordinate data Px of the pointer stored in register 17*l*, dot number dx in the X direction of section 19 (in this case, "121"), and dot-span number m from the dot of the displayed pointer to a dot representing one side of a range in the X direction, after the current display range is reduced (in this case, "1"):

$$Px + (X\max - Px)(dx - 1)/2m \qquad (29)$$

$$Px - (X\max - Px)(dx - 1)/2m \qquad (30)$$

The resultant values from the above arithmetic operations are stored in registers 17*i* and 17*h*, as the new X-coordinate range data. Similarly, in step J3, the following arithmetic operations are performed using the Y-coordinate range data stored in registers 17*j* and 17*k*, Y-coordinate data Py of the pointer stored in register 17*m*, dot number dy in the Y direction of section 19 (in this case, "101"), and dot-span number n from the dot of the displayed pointer to a dot representing one side of a range in the Y direction, after the current display range is reduced (in this case, "1"):

$$Py + (Y\max - Py)(dy - 1)/2n \qquad (31)$$

$$Py - (Y\max - Py)(dy - 1)/2n \qquad (32)$$

The results from the above arithmetic operations are respectively stored in registers 17*k* and 17*j*, as the new Y-coordinate range data. After the new range data is set, the flow advances to step J4, and graph formula data (in this case, "Y=sin X") is read out from graph display buffer 17*a*, of memory section 17, to arithmetic operation section 15. In step J5, graph display data is calculated using the readout graph formula data, the range data stored in registers 17*h*, 17*i*, 17*j*, and 17*k*, updated in steps J2 and J3, and dot number data dx and dy, constituting the dot matrix of display section 19 (in this case, "121" and "101"), and the calculated result is written in buffer 13. In step J6, the display data stored in buffer 13 is supplied to display section 19, in response to a control command from control section 12 and pointer controller 20, and a graph which is reduced, having the pointer display position as the central point, is displayed, as shown in FIG. 21B.

Next, a case will be described wherein a displayed graph is reduced to a specific number of dots (e.g., 3×3 dots), having the pointer as the center point, so that the pointer is displayed at the center of the screen of section 19.

Assume that a graph is displayed in display section 19 in the state shown in FIG. 21A, and the pointer is flickered on the graph curve.

Figure 21C:
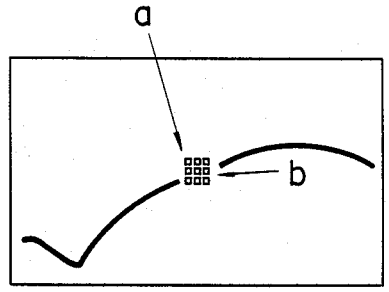
Figure 23:
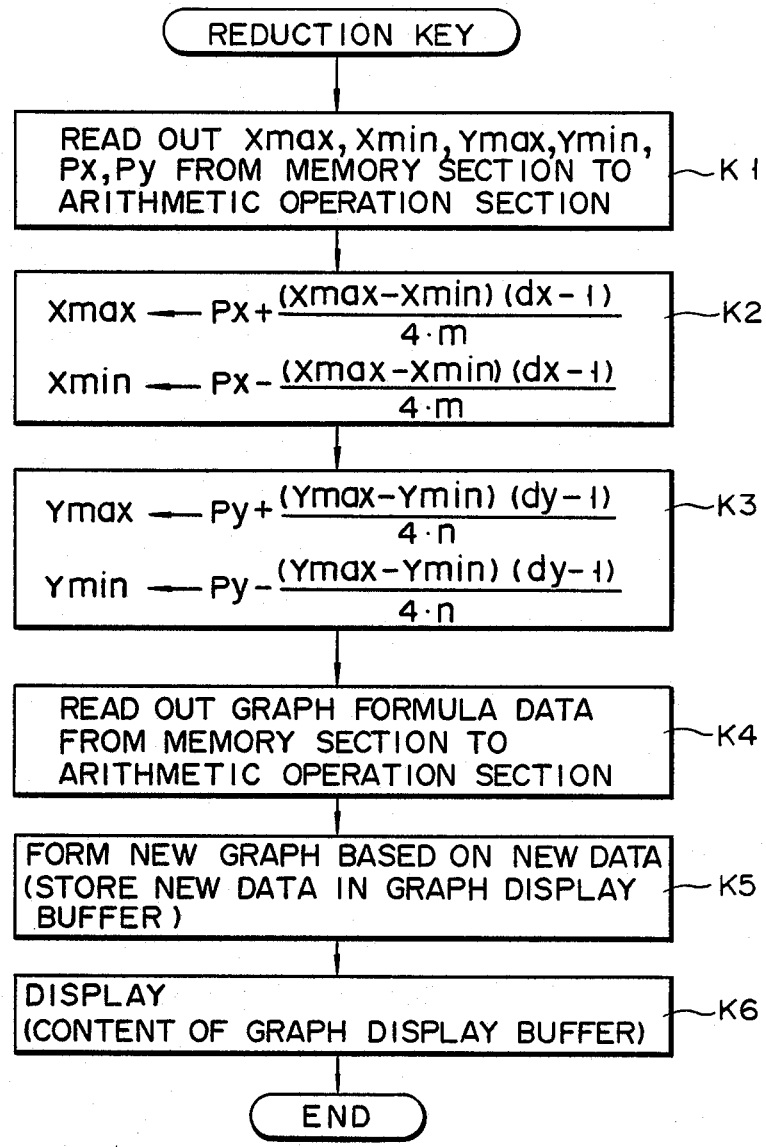

When reduction key 11p is operated as shown in FIG. 21C, processing of FIG. 23 is executed in response thereto.

Referring to FIG. 23, in step K1, range data stored in registers 17h, 17i, 17j, and 17k and coordinate data Px and Py of the pointer stored in registers 17l and 17m, are read out to arithmetic operation section 15. In step K2, the following arithmetic operations are performed using the X-coordinate range data stored in registers 17h and 17i, X-coordinate data Px of the pointer stored in register 17l, dot number dx in the X direction of display section 19 (in this case, "121"), and dot-span number m from the dot of the displayed pointer to a dot representing one side of a range in the X direction, after the current display range is reduced (in this case, "1"):

$$Px + (X\max - X\min)(dx - 1)/4m \quad (33)$$

$$Px - (X\max - X\min)(dx - 1)/4m \quad (34)$$

The results from the above arithmetic operations are respectively stored in registers 17i and 17k, as the new X-coordinate range data. Similarly, in step K3, the following arithmetic operations are performed using the Y-coordinate range data stored in registers 17j and 17k, Y-coordinate data Py of the pointer stored in register 17m, dot number dy in the Y direction of display section 19 (in this case, "101"), and dot-span number n from the dot of the displayed pointer to a dot representing one side of a range in the Y direction, after the current display range is reduced (in this case, "1"):

$$Py + (Y\max - Y\min)(dy - 1)/4n \quad (35)$$

$$Py - (Y\max - Y\min)(dy - 1)/4n \quad (36)$$

The results from the above arithmetic operations are respectively stored in registers 17k and 17j, as the new Y-coordinate range data. After the new range data is set as above, the flow advances to step K4, and graph formula data (in this case, "$Y = \sin X$") is read out from graph formula register 17a, of memory section 17, to arithmetic operation section 15. In step K5, graph display data is calculated using the readout graph formula data, the range data stored in registers 17h, 17i, 17j, and 17k, (after being updated in steps K2 and K3), and dot number data dx and dy constituting the dot matrix of display section 19 (in this case, "121" and "101"), and the calculated result is written in buffer 13. In step K6, the display data stored in buffer 13 is supplied to display section 19, in response to a control command from control section 12 and pointer controller 20, and a graph which is reduced, having pointer as the center of the screen, is displayed, as shown in FIG. 21C.

Figure 24:
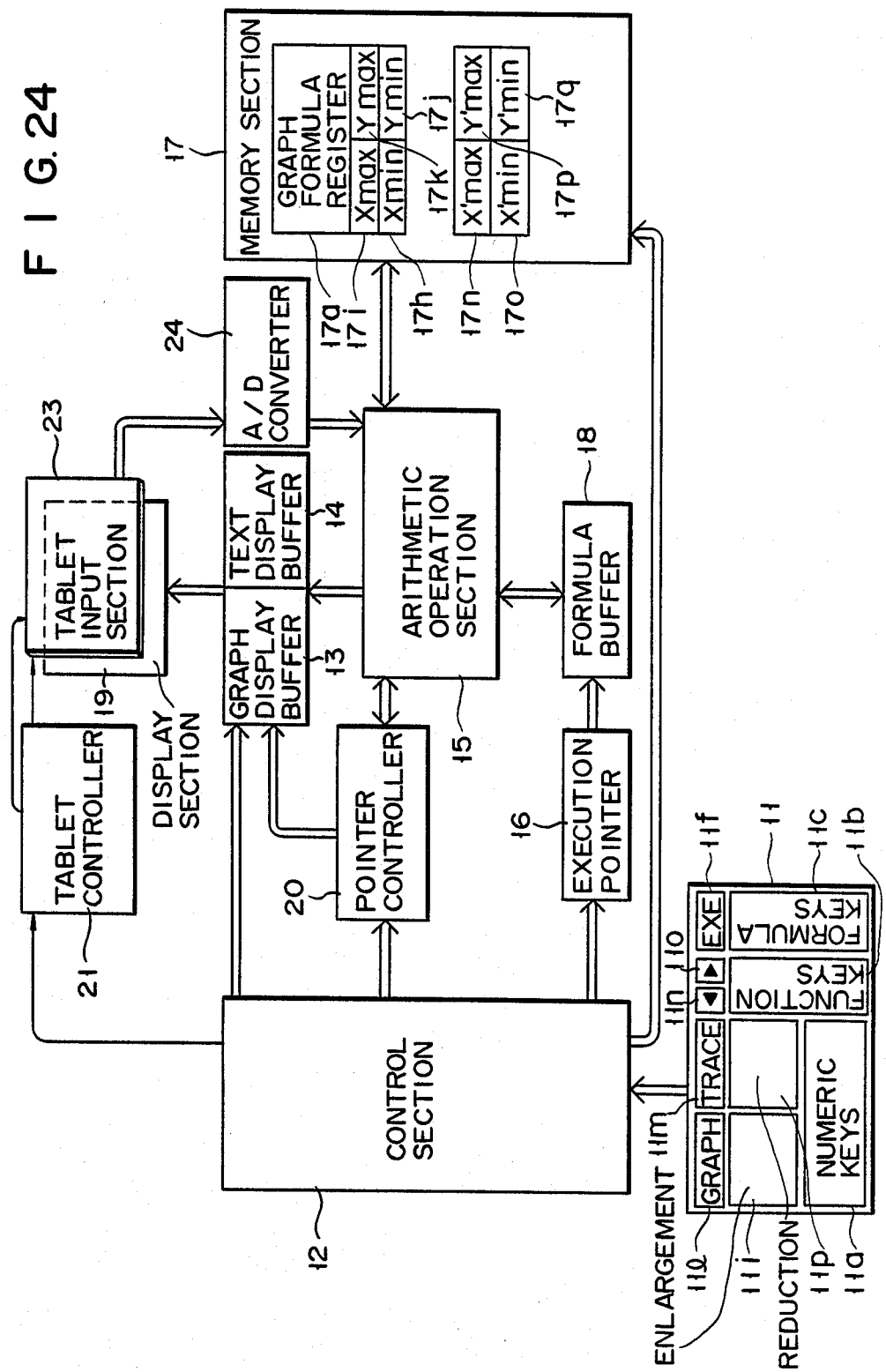
FIG. 24 is a block diagram of an electronic calculator according to a fifth embodiment of the present invention.

FIG. 24 is a block diagram of an electronic calculator according to a fifth embodiment of the present invention. The same reference numerals in FIG. 24 denote the same parts as in the block diagrams of the above embodiments. In this embodiment, tablet input section 23 is additionally provided in display section 19, thus allowing a tablet input operation, in addition to that of key input section 11. Section 23 is connected to tablet controller 21. Tablet controller 21 applies a voltage to tablet input section 23, arranged integrally with section 19, in response to a control signal from control section 12. Tablet input section 23 comprises a transparent member (to be described later). When an operator depresses the transparent member with his finger, a pen, or the like, voltage data corresponding to the depressed position is supplied to A/D converter 24. A/D converter 24 converts the analog voltage data into digital data, and supplies it to memory section 17, through arithmetic operation section 15, as designated coordinate data, upon operation of section 23. Memory section 17 stores various data associated with graph display, and comprises graph formula register 17a, Xmax register 17i, Xmin register 17h, Ymax register 17k, and Ymin register 17j, for storing range data, and X'max register 17n, X'min register 17o, Y'max register 17p, and Y'min register 17q, for storing a range designated by section 23, i.e., data necessary for calculating a new range for graph enlargement/reduction. In addition, memory section 17 performs data communication with arithmetic operation section 15, in response to a control command from control section 12.

A peripheral arrangement of tablet input section 23 will now be described with reference to FIG. 25.

Referring to FIG. 25, tablet input section 23 comprises two ITO (transparent conductive) films 231 and 232, with a spacer of a gap material or the like (not shown), provided therebetween. A constant voltage (e.g., 5 V) from power source 233 is applied across both ends of one of ITO films 231 and 232, under the control of controller 21, and one end of the remaining film, i.e., an end portion in a direction perpendicular to the voltage-application direction, is opened. This state is alternately inverted at a specific timing. For example, assume the voltage is applied to ITO film 231, and one end of ITO film 232 is opened. If a given point on section 23 is depressed, a voltage applied to film 231 is divided by resistance and is derived from an opposite end portion to the open end of film 232, as voltage data. When this voltage data is converted into digital data by A/D converter 24, one coordinate of the depressed portion on section 23 can be detected. At the next timing, the same detecting operation as above is performed while the voltage is applied to film 232, and one end of film 231 is opened. The obtained voltage data is then converted into digital data. These two digital data correspond to a pair of coordinate data (i.e., indicating X and Y coordinates), and the depressed position on section 23, i.e., designated coordinate position of display section 19, can thus be detected.

The operation of this embodiment will now be described.

Figure 26D:
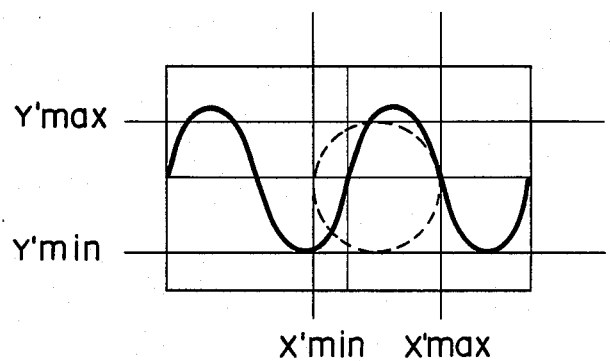

FIGS. 26A through 26E show operations and states of display section 19 and tablet input section 23, when a displayed graph is to be enlarged. First, Graph key 11l is operated as shown in FIG. 26A, and EXE key 11f is operated after a "Sin" key of function keys 11c is operated. Upon operation of these keys, formula data $$Y = \sin X$$

is stored in graph formula register 17a, of memory section 17, and in formula buffer 18, through arithmetic operation section 15. At the same time, although not shown, when "−360", "360", "−1.6", and "1.6" are respectively input to registers 17h, 17i, 17j, and 17k, these storage contents are read out to arithmetic operation section 15. Section 15 calculates graph display data based on these data and dot-number data constituting a dot matrix of display section 19, and supplies the calculated data to graph display buffer 13. The formula $Y = \sin X$ is displayed on section 19, in accordance with the graph display data stored in buffer 13, as shown in FIG. 26A.

Figure 27:
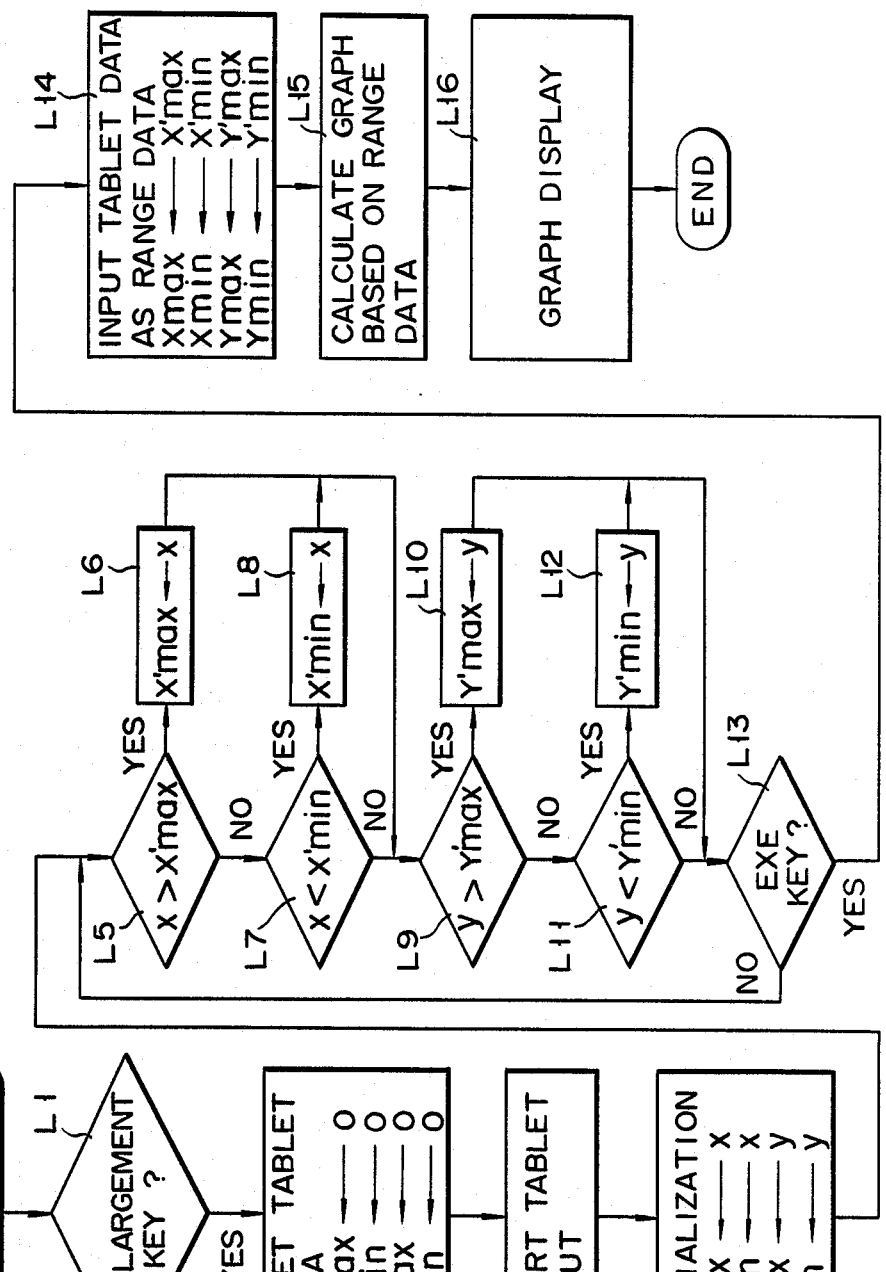
FIG. 27 is a flow chart showing enlargement processing of a displayed graph.

When enlargement key 11i is operated as shown in FIG. 26B, control section 12 detects this key operation, and executes enlargement processing shown in FIG. 27.

Referring to FIG. 27, a check is made, in step L1, whether the key input corresponds to the operation of enlargement key 11i. If NO, in step L1, other processing is performed. In this case, since YES is obtained in step L1, the flow advances to step L2. In step L2, the contents of registers 17m, 17o, 17p, and 17p, are cleared to "0" in response to the control command from control section 12. Thereafter, in step L3, new display range designation starts upon depression of tablet input section 23. Assume that a tablet input, indicated by a broken line on display section 19, in FIG. 26B, is performed. When the tablet input operation starts, a signal is supplied from control section 12 to tablet controller 21, and controller 21 appropriately applies the voltage to section 23, as shown in FIG. 25. Coordinate data first supplied from section 23 is set to an initial value in step L4. More specifically, the X-coordinate data of the coordinate data is set in registers 17n and 17o, and the Y-coordinate data thereof is set in registers 17p and 17q. The subsequent coordinate data is stored in registers 17n, 17o, 17p, and 17q, in accordance with its content in the processing in step L5 and thereafter. A check is made, in step L5, whether the new X-coordinate data is larger than the content of register 17n. If YES, in step L5, the flow advances to step L6, and the new X-coordinate data is set in register 17n. However, if NO, in step L5, the flow advances to step L7, to check if the new X-coordinate data is smaller than the content of register 17o. If YES, in step L7, the flow advances to step L8, and the new X-coordinate data is set in register 17o. However, if NO, in step L7, the flow advances to step L9. Step L9 is also executed after steps L6 and L8 are completed, and a check is made whether the new Y-coordinate data is larger than the content of register 17p. If YES, in step L9, the flow advances to step L10, and the new Y-coordinate data is set in register 17p. However, if NO, in step L9, the flow advances to step L11 to check if the new Y-coordinate data is smaller than the content of register 17q. If YES, in step L11, the flow advances to step L12, and the new Y-coordinate data is set in register 17q. However, if NO, in step L11, the flow advances to step L13. Step L13 is also executed after steps L10 and L12 are completed, and a check is made whether EXE key 11f is operated. If NO, in step L13, the operation from step L5 is repeated using new X- and Y-coordinate data input at the next timing.

In this way, the contents of registers 17n, 17o, 17p, and 17q are updated, upon depression of section 23, to input the new range data of the display range. When EXE key 11f is then operated as shown in FIG. 26C, YES is obtained in step L13, and the flow advances to step L14. In step L14, the range data stored in registers 17n, 17o, 17p, and 17q, input by the processing of steps L5 through L12, are respectively transferred to registers 17i, 17h, 17k, and 17j. In step L15, arithmetic operation section 15 calculates graph display data, based on the new range data stored in registers 17i, 17h, 17k, and 17j, formula data stored in register 17a, and dot-number data constituting the dot matrix of display section 19, and stores the calculated data in graph display buffer 13. In step L16, graph enlargement display is performed so that a range designated by the tablet inputs is enlarged over the entire screen of display section 19, in accordance with the display data stored in buffer 13, as shown in FIG. 26C.

Figure 28A:
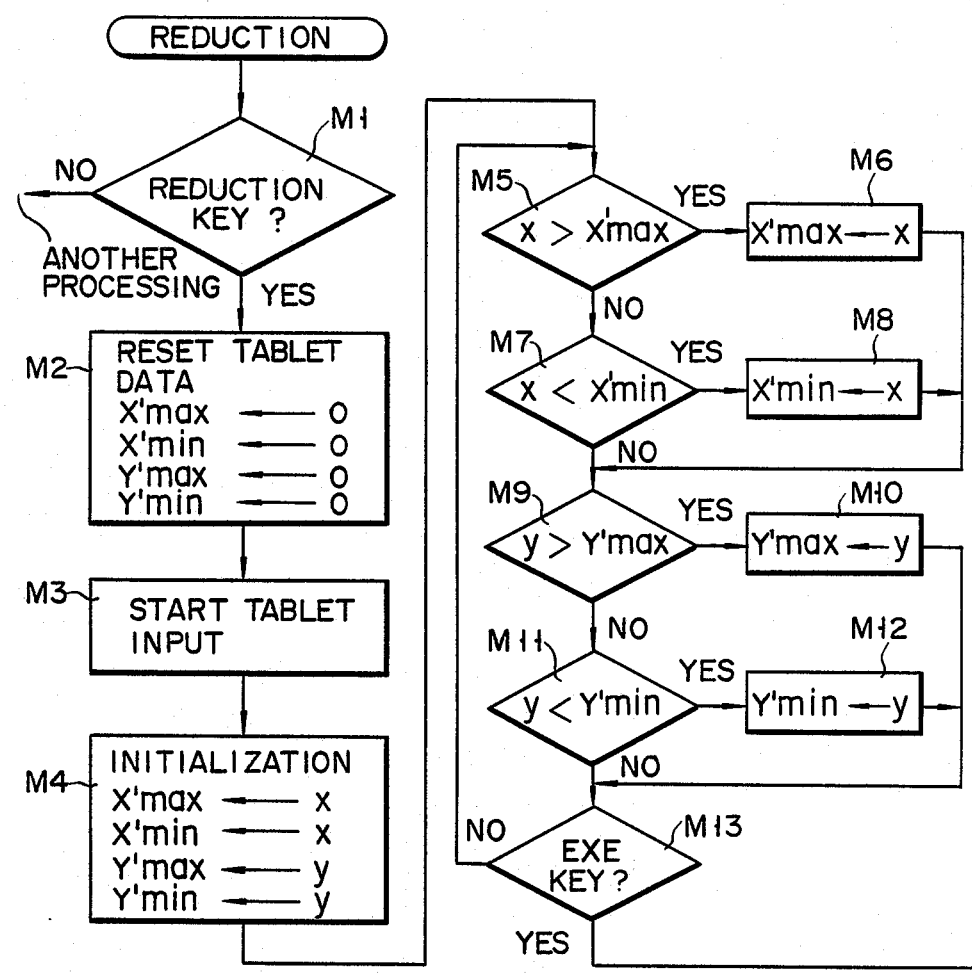

When reduction key 11p is operated instead of key 11i, in the state shown in FIG. 26A, processing of FIG. 28 is executed in response thereto.

Referring to FIG. 28, a check is made, in step M1, whether the key input corresponds to the operation of reduction key 11p. If NO in step M1, other processing is performed. In this case, since YES is obtained in step M1, the flow advances to step M2. In step M2, the contents of registers 17n, 17o, 17p, and 17p, are cleared to "0" in response to the control command from control section 12. Thereafter, in step M3, new display range designation of the currently displayed screen starts upon depression of section 23. Assume that a tablet input, indicated by broken lines in FIG. 26D, on section 19, is performed. When the tablet input starts, a signal is supplied from control section 12 to tablet controller 21, which appropriately applies the voltage to section 23, as shown in FIGS. 26A to 26E. Coordinate data first supplied from section 23 is set to an initial value in step M4. More specifically, X-coordinate data of the coordinate data is set in registers 17n and 17o, and Y-coordinate data thereof is set in registers 17p and 17q. The subsequent coordinate data is input to registers 17n, 17o, 17p, and 17q, in accordance with its content, by the processing in step M5 and thereafter. A check is made, in step M5, whether new X-coordinate data is larger than the content of register 17n. If YES, in step M5, the flow advances to step M6, and the new X-coordinate data is set in register 17n. However, if NO, in step M5, the flow advances to step M7 to check if the new X-coordinate data is smaller than the content of register 17o. If YES, in step M7, the flow advances to step M8, and the new X-coordinate data is set in register 17o. However, if NO, in step M7, the flow advances to step M9. Step M9 is also executed after steps M6 and M8 are completed, to check if new Y-coordinate data is larger than the content of register 17p. If YES, in step M9, the flow advances to step M10, and the new Y-coordinate data is set in register 17p. However, if NO, in step M9, the flow advances to step M11 to check if the new Y-coordinate date is smaller than the content of register 17q. If YES, in step M11, the flow advances to step M12, and the new Y-coordinate data is set in register 17q. If NO, in step M11, the flow advances to step M13. Step M13 is also executed after steps M10 and M12 are completed, to check if EXE key 11f is operated. If NO is obtained in step M13, the control loop from step M5 is repeated using new X- and Y-coordinate data input at the next timing.

Figure 26E:
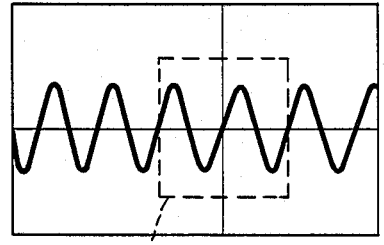

In this way, the contents of registers 17n, 17o, 17p, and 17q are updated upon depression of section 23, to set the range data of the new display range. When EXE key 11f is then operated as shown in FIG. 26E, the key operation signal is supplied to Control Section 12. Therefore, since YES is obtained in step M13, the flow advances to step M14. In step M14, Arithmetic Operation Section 15 performs the following arithmetic operations, using new range designation data stored in registers 17n, 17o, 17p, and 17q, input by the processing of steps M5 through M12, and the current range data stored in registers 17i, 17h, 17k, and 17j:

$$X\text{max} + [(X'\text{max} - X'\text{max})(X\text{max} - X\text{min})] \quad (37)$$
$$/(X'\text{max} - X'\text{min})$$

$$X\text{min} - [(X'\text{min} - X\text{min})(X\text{max} - X\text{min})] \quad (38)$$
$$/(X'\text{max} - X'\text{min})$$

$$Y\text{max} + [(Y'\text{max} - Y'\text{max})(Y\text{max} - Y\text{min})] \quad (39)$$
$$/(Y'\text{max} - Y'\text{min})$$

$$Y\text{min} - [(Y'\text{min} - Y\text{min})(Y\text{max} - Y\text{min})] \quad (40)$$
$$/(Y'\text{max} - Y'\text{min})$$

The calculated results are respectively stored in registers $17i$, $17h$, $17k$, and $17j$. In step M15, Arithmetic section 15 calculates graph display data using new range data stored in registers $17i$, $17h$, $17k$, and $17j$, the formula data stored in register $17a$, and dot-number data constituting the dot matrix of section 19, and stores the calculated result in buffer 13. In step M16, graph reduction display is performed so that a displayed screen is reduced to a range designated by tablet inputs, in accordance with the display data stored in buffer 13.

What is claimed is:

1. An electronic calculator having a graph display function, comprising:
    display means including a display region of a certain size for displaying a graph of a given formula having a variable, the display region being adapted to define a range of coordinates for the variable of said formula;
    input means for inputting said formula, and for inputting range data corresponding to a desired range of the value of the variable of the formula for display by the display region;
    formula storage means for storing the formula input by said input means;
    range data storage means for storing the range data input by said input means;
    graph pattern producing means, coupled to said formula storage means and to said range data storage means, for producing graph pattern data of a certain extent, said graph pattern producing means including means for determining the range of coordinates to be defined by the display region of said display means based on the range data input for the variable of said formula;
    display control means, coupled to said display means and to said graph pattern producing means, for supplying the graph pattern data produced by said graph pattern producing means to said display means to obtain the graph display of said formula; and
    range changing means, coupled to said range data storage means, for altering the range data stored in said range data storage means for said variable, so that the extent of the graph pattern data produced by said graph pattern producing means is changed based on the range data for said variable as altered by said range changing means, and a new range of coordinates for the variable as determined by the graph pattern producing means is defined for the display region of said display means.

2. An electronic calculator according to claim 1, comprising magnification factor key means coupled to said range changing means, for designating a certain enlargement of the size of graph data as displayed on said display means, wherein said range changing means includes means for altering said range data according to the enlargement designated by said factor key means.

3. An electronic calculator according to claim 2, wherein said magnification factor key means includes means for designating said enlargement in accordance with key-input numeric data.

4. An electronic calculator according to claim 2, wherein said range changing means includes coordinate designating means for designating coordinates of a desired point in the display region of said display means; and
    said range changing means including means for altering said range data in accordance with an enlargement designated by said magnification factor key means according to the coordinates designated by said coordinate designating means.

5. An electronic calculator according to claim 4, wherein said coordinate designating means includes means for designating coordinates in accordance with a position of a cursor as traced along a graph displayed by said display means.

6. An electronic calculator according to claim 1, wherein said range changing means includes means for designating at least two desired points in the display region of said display means, and means for computing the range of a graph to be displayed by said display means according to the two designated points, so that a graph pattern of a given size is displayed by said display means in accordance with range data computed by said computing means.

7. An electronic calculator according to claim 1, wherein said input means comprises a tablet of transparent material, arranged integrally with the display region of said display means, and for detecting coordinate position data upon depression of said tablet, and wherein said range changing means includes range designating means for designating a range on the display region of said display means upon depression of said tablet, wherein the size of a graph of the formula as displayed by said display means is changed in accordance with range data produced by said range designating means.

* * * * *